US010580540B2

United States Patent
Leuenroth et al.

(10) Patent No.: US 10,580,540 B2
(45) Date of Patent: Mar. 3, 2020

(54) NEUTRON ABSORBER MEMBER CONFIGURED FOR INSERTION INTO A CONTROL ROD GUIDE TUBE OF A SPENT FUEL ASSEMBLY

(71) Applicant: Curtiss-Wright Flow Control Corporation, Falls Church, VA (US)

(72) Inventors: Karl Scot Leuenroth, Newburgh, NY (US); Matthew Lee Eyre, Ulster Park, NY (US); James Raymond Loeven, Pawling, NY (US)

(73) Assignee: CURTISS-WRIGHT FLOW CONTROL CORPORATION, Falls Church, VA (US)

(*) Notice: Subject to any disclaimer, the term of this patent is extended or adjusted under 35 U.S.C. 154(b) by 227 days.

(21) Appl. No.: 15/862,733

(22) Filed: Jan. 5, 2018

(65) Prior Publication Data

US 2018/0144837 A1 May 24, 2018

Related U.S. Application Data

(63) Continuation-in-part of application No. 14/458,737, filed on Aug. 13, 2014, now abandoned.

(51) Int. Cl.
| *G21C 19/40* | (2006.01) |
| *G21F 1/06* | (2006.01) |
| *G21C 19/07* | (2006.01) |
| *G21F 3/00* | (2006.01) |
| *G21C 7/06* | (2006.01) |
| *G21C 3/32* | (2006.01) |

(52) U.S. Cl.
CPC ............. *G21C 19/40* (2013.01); *G21C 19/07* (2013.01); *G21F 1/06* (2013.01); *G21F 3/00* (2013.01); *G21C 3/32* (2013.01); *G21C 7/06* (2013.01)

(58) Field of Classification Search
CPC .......... G21C 19/40; G21C 19/07; G21C 7/06; G21C 7/10; G21F 3/00; G21F 1/06
USPC .................................. 376/272, 327, 335, 339
See application file for complete search history.

(56) References Cited

U.S. PATENT DOCUMENTS

| 3,013,725 A | 12/1961 | Lee |
| 4,608,495 A | 8/1986 | Jacobson |
| 4,800,283 A | 1/1989 | Efferding |

(Continued)

FOREIGN PATENT DOCUMENTS

| DE | 19628362 C1 | 3/1998 |
| EP | 0016252 A1 | 10/1980 |

(Continued)

OTHER PUBLICATIONS

International Search Report and Written Opinion of Corresponding Application No. PCT/US2015/037393; dated Sep. 24, 2015.

*Primary Examiner* — Jack W Keith
*Assistant Examiner* — Daniel Wasil
(74) *Attorney, Agent, or Firm* — Pearne & Gordon LLP

(57) ABSTRACT

A neutron absorber member including a tube having a split extending radially completely through a sidewall of said tube throughout the entire axial length thereof such that the absorber member has a C-shaped geometry formed by the split. The sidewall of the tube is resiliently biased radially outwards and comprised of a metal matrix composite that is configured to absorb neutrons emanation from a spent fuel assembly in a sufficient amount to thereby maintain subcriticality of said spent fuel assembly.

10 Claims, 23 Drawing Sheets

(56) References Cited

U.S. PATENT DOCUMENTS

| | | |
|---|---|---|
| 5,416,813 A | 5/1995 | Hiraiwa |
| 5,479,463 A | 12/1995 | Roberts |
| 5,629,964 A | 5/1997 | Roberts |
| 5,812,623 A | 9/1998 | Holden |
| 5,841,825 A | 11/1998 | Roberts |
| 6,327,321 B1 | 12/2001 | Holman |
| 6,741,669 B2 | 5/2004 | Lindquist |
| 6,891,914 B1 | 5/2005 | Sakashita et al. |
| 8,717,849 B1 | 5/2014 | Zarnetske |
| 2010/0176314 A1 | 7/2010 | Smith |
| 2010/0176318 A1 | 7/2010 | Smith |

FOREIGN PATENT DOCUMENTS

| | | | |
|---|---|---|---|
| EP | 1 096 507 A1 | 5/2001 | |
| GB | 1126218 * | 9/1968 | ............... G21C 7/10 |
| JP | H02129598 A | 5/1990 | |
| JP | H07-146390 A | 6/1995 | |
| JP | 2980394 B2 | 11/1999 | |
| JP | 2002-328192 A | 11/2002 | |
| WO | 00/26921 A2 | 5/2000 | |

\* cited by examiner

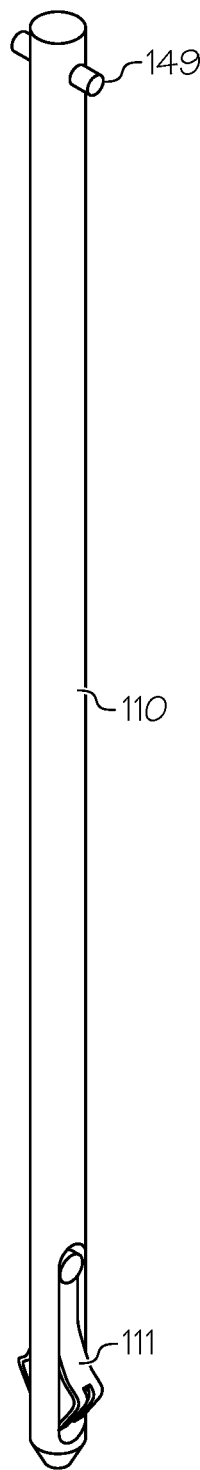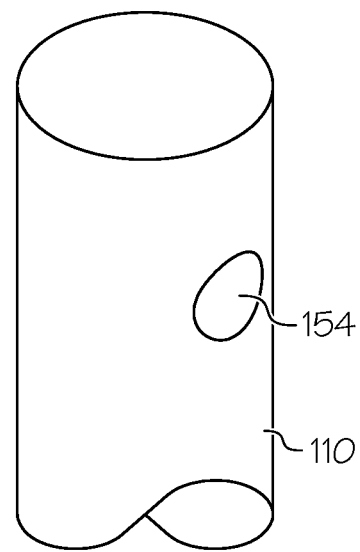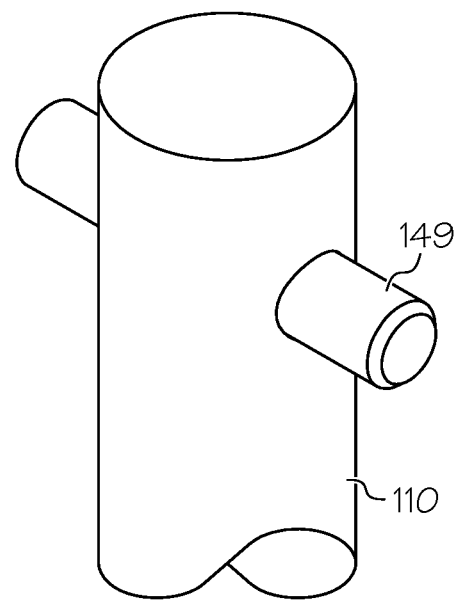
FIG. 10
FIG. 11
FIG. 12

NEUTRON ABSORBER MEMBER CONFIGURED FOR INSERTION INTO A CONTROL ROD GUIDE TUBE OF A SPENT FUEL ASSEMBLY

CROSS-REFERENCE TO RELATED APPLICATIONS

This application is a continuation-in-part of U.S. patent application Ser. No. 14/458,737 filed Aug. 13, 2014, the entire disclosure of which is hereby incorporated herein by reference.

BACKGROUND

1. Field

The following description relates to neutron absorber members for a control rod guide tube of a spent fuel assembly, an insertion apparatus for inserting a neutron absorber member into a control rod guide tube of a spent fuel assembly, and a neutron absorber member retainer for a top nozzle of a spent fuel assembly.

2. Description of Related Art

It is known for spent fuel assemblies of nuclear reactors to be stored in pools of water after fuel within the assemblies is depleted. It is additionally known for neutron absorbers to be inserted into control rod guide tubes of the spent fuel assembly to ensure subcriticality of the spent fuel assembly while in the pool.

SUMMARY

In accordance with one aspect, there is provided a neutron absorber member that is configured to be inserted and installed into a control rod guide tube of a spent fuel assembly. The absorber member comprises a tube having a split extending radially completely through a sidewall of said tube throughout the entire axial length thereof. As such, the absorber member comprises a C-shaped geometry formed by the split.

The tube is comprised of a metal matrix composite that is configured to absorb neutrons emanating from said spent fuel assembly in a sufficient amount to thereby maintain subcriticality of said spent fuel assembly. Further, the sidewall of the tube is resiliently biased radially outward and the axial length of the tube is greater than or equal to 3 feet (1 meter).

BRIEF DESCRIPTION OF THE DRAWINGS

FIG. 10 is a perspective view illustrating an example of an insertion tool rod.

FIG. 11 is a perspective view illustrating an example of an upper portion of the insertion tool rod of FIG. 10.

FIG. 12 is a perspective view illustrating an example of the upper portion of the insertion tool rod of FIG. 11 having a dowel pin installed in a hole of the insertion tool rod.

DETAILED DESCRIPTION

Figure 1:
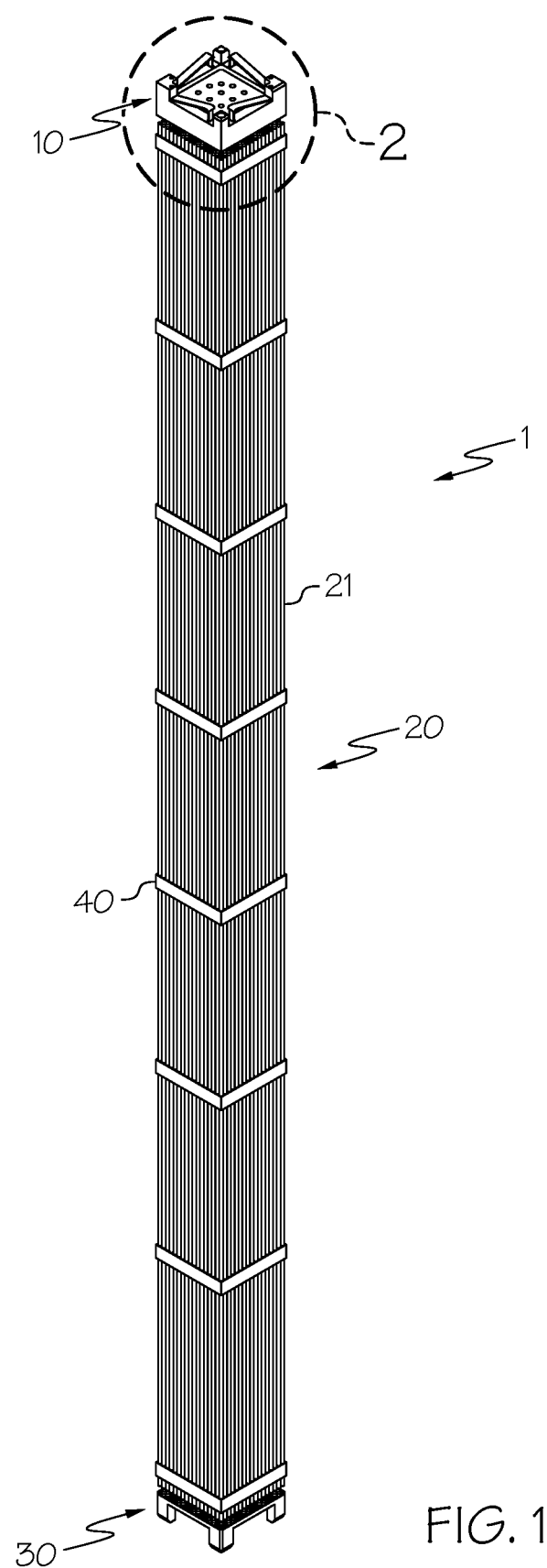
FIG. 1 is a perspective view illustrating an example of a fuel assembly.
Figure 2:
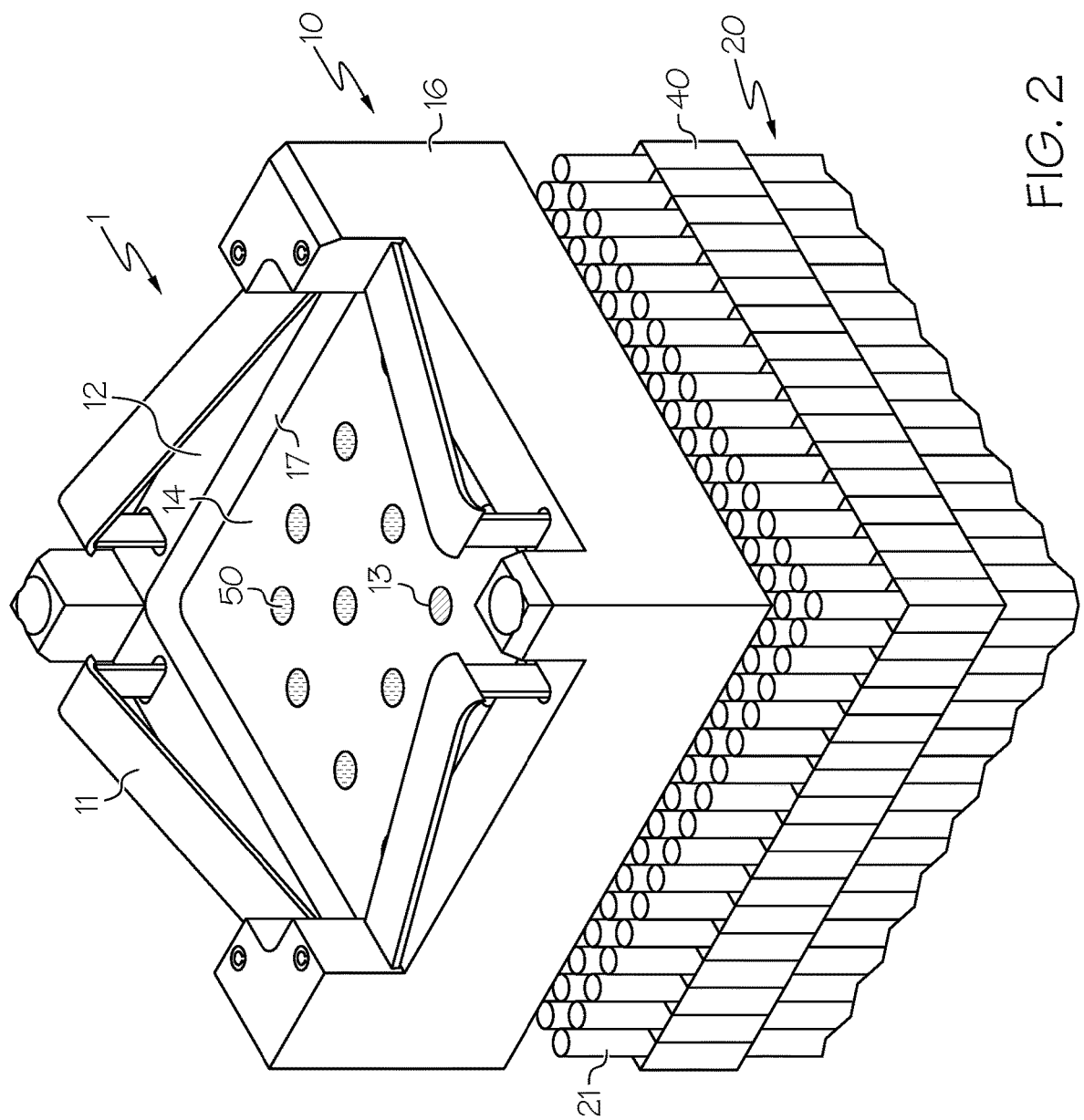
FIG. 2 is a perspective view illustrating an example of an upper portion of the fuel assembly taken in area 2 of FIG. 1.

An example apparatus will now be described more fully hereinafter with reference to the accompanying drawings in which embodiments of the disclosure are shown. Whenever possible, the same reference numerals are used throughout the drawings to refer to the same or like parts.

In examples illustrated in FIGS. 1-8, a spent fuel assembly 1 includes a top nozzle 10, a bundle 20 of fuel rods 21, and a bottom nozzle 30. The bundle 20 of fuel rods 21 extends between the top nozzle 10 and the bottom nozzle 30. The fuel rods 21 are secured to the bundle 20 by a plurality of grid guides 40 that laterally surround the bundle 20 at different points along a length of the bundle 20. A lateral shape of the top nozzle 10 and the bottom nozzle 30 may correspond to a lateral shape of the bundle 20 of fuel rods 21.

At least one control rod guide tube 50 and an instrumentation tube 13 are located within an interior portion of the bundle 20. In the examples described and illustrated herein, the instrumentation tube 13 is placed in a center of the bundle 20, and multiple control rod guide tubes 50 are placed in various positions within the bundle 20 surrounding the instrumentation tube 13. However, examples disclosed herein are not limited thereto, as the control rod guide tubes 50 and the instrumentation tube 13 may be placed at any location within the bundle 20 to maintain reactivity control of the fuel rods 21 during operation or subcriticality of the fuel assembly 1 when the fuel in the fuel rods 21 is spent. Further, an amount of control rod guide tubes 50 included within the bundle 20 may vary in accordance such that control of the fuel rods 21 during operation or subcriticality of the fuel assembly 1 when the fuel in the fuel rods 21 is spent is maintained.

The control rod guide tubes 50 and the instrumentation tube 13 are accessible at the top nozzle 10 through a surface 14 and within a predominately square periphery of the surface 14 surrounding a portion of the surface 14 at which the control rod guide tubes 50 and the instrumentation tube 13 are accessible. The predominately square periphery corresponds with a plurality of ledges 12 positioned above the surface 14. The ledges 12 extend inward from an outer surface of the top nozzle 10 and include bottom surfaces 15 oriented horizontally over portions of the surface 14 at which there is no access to the control rod guide tubes 50 or the instrumentation tube 13. Outer portions 16 of the ledges 12 define an outer shape of the top nozzle 10. A plurality of hold down springs 11 may be positioned on, and configured to collapse within, the ledges 12 to position the fuel assembly 1 in relation to other elements of a reactor (not shown) during reactor operation.

During operation of the reactor in which the fuel assembly 1 is used, a flux-probing monitor (not shown) may be inserted into the instrumentation tube 13 to map local neutron flux. Further, control rods (not shown) may be inserted into the control rod guide tubes 50 to control neutron flux of the fuel assembly 1 during operation of the reactor. In the examples described herein, the fuel assembly 1 is described as being a pressurized water reactor (PWR). However, embodiments disclosed herein are not limited thereto.

Additionally, during the operative lifetime of the reactor in which the fuel assembly 1 is used, the control rod guide tubes 50 are subjected to different levels of intensity of neutron flux along their axial lengths. This differential flux causes certain sections of each control rod guide tube 50 to deform (e.g., expand and/or contract from an as-manufactured state) and/or bend relative to other sections. Moreover, these deformities are amplified due to the relatively long lengths of the control rod guide tubes 50. The control rod guide tubes in many reactors are fairly long, such as about 14 feet long.

In one example of differential flux, typically the neutron flux is more intense near the center of the reactor. As such the control rod guide tubes 50 tend to deform more about their center sections as opposed to their end sections and thus create a U-shaped bulge around the center section. In an alternative example, one end section of the control rod guide tubes 50 can experience a greater amount of neutron flux than the other sections, thus causing each control rod guide tube 50 to have a curved shape (i.e., a "banana shape"). In any event, most if not all control rod guide tubes will often have some manner of deformity along its length that makes it extremely difficult to completely insert neutron absorbers similar in size to the interior diameter of the control rod guide tubes 50 when they are of the conventional, complete cylindrical shape because the conventional absorbers will bind due to geometry differences and/or friction when they encounter a deformity in the control rod guide tubes.

After the fuel assembly 1 is spent or depleted and moved into a storage pool of water (not shown), neutron absorber members 60 can be inserted into the control rod guide tubes 50 to absorb neutrons emanating from the fuel rods 21 of the bundle 20, thereby maintaining subcriticality of the fuel assembly 1 within the storage pool. The fuel assembly is submerged in a deep spent fuel pool for upwards of 10 to 20 years. After its time in the deep spent fuel pool, the fuel assembly is transferred to dry casks and transported to dry storage areas for long-term safe storage. Due to the aforementioned deformity of the control rod guide tubes 50 caused by differential neutron flux, inserting conventional neutron absorber members 60 of similar diameter into said deformed control rod guide tubes 50 becomes difficult. Specifically, conventional neutron absorber members 60 (i.e., completely cylindrical in shape) will bind at the deformed sections due to geometrical differences and/or friction. Extra force must be applied to the neutron absorber members 60 to overcome these deformed sections of the control rod guide tubes 50, which may cause buckling or other damage to the neutron absorber members 60.

Figures 3, 4:
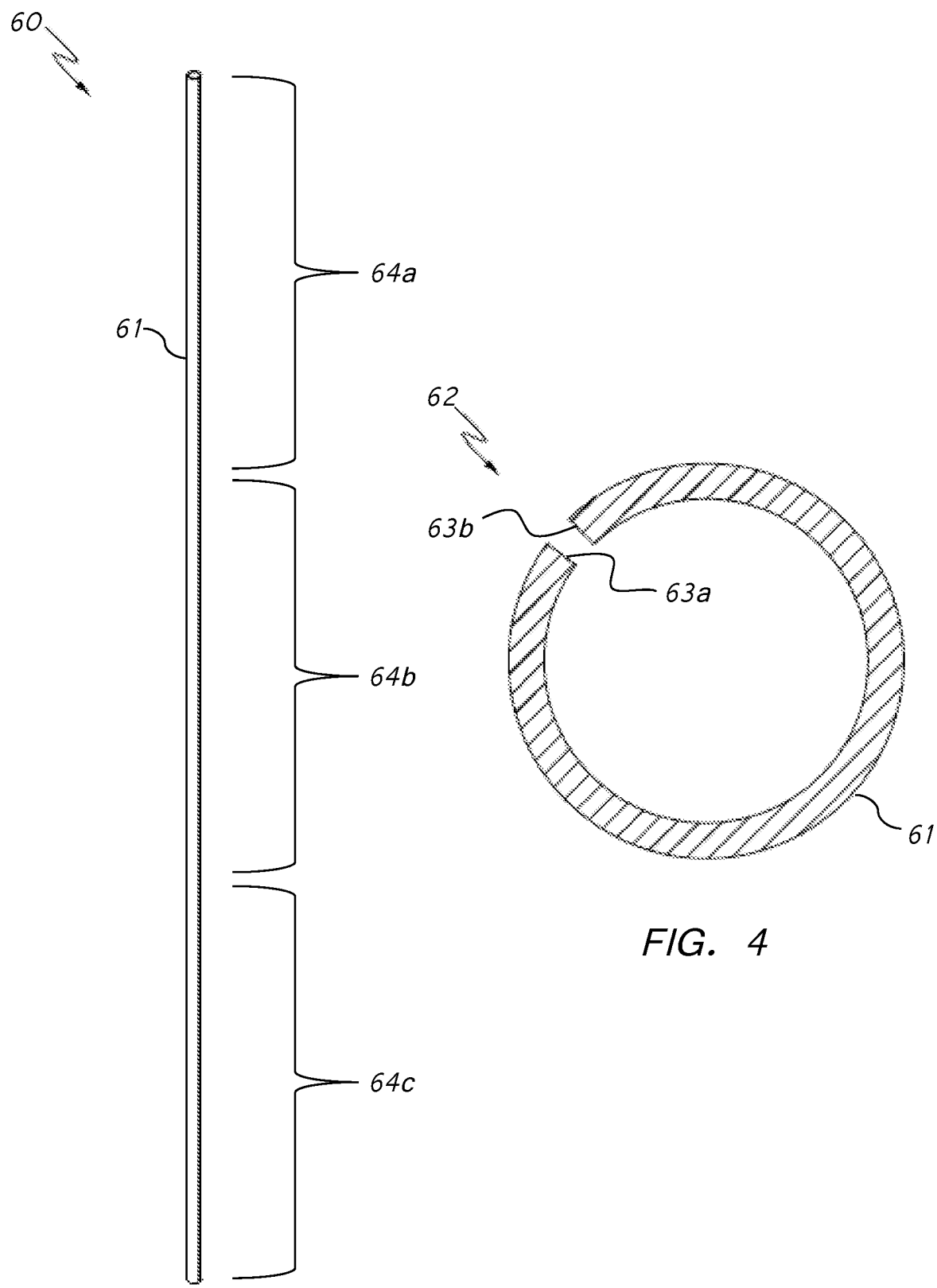
FIG. 3 is a schematic illustration of a neutron absorber member.
FIG. 4 is a cross-sectional view taken perpendicular to the elongated axis of the neutron absorber member of FIG. 3.
Figure 5:
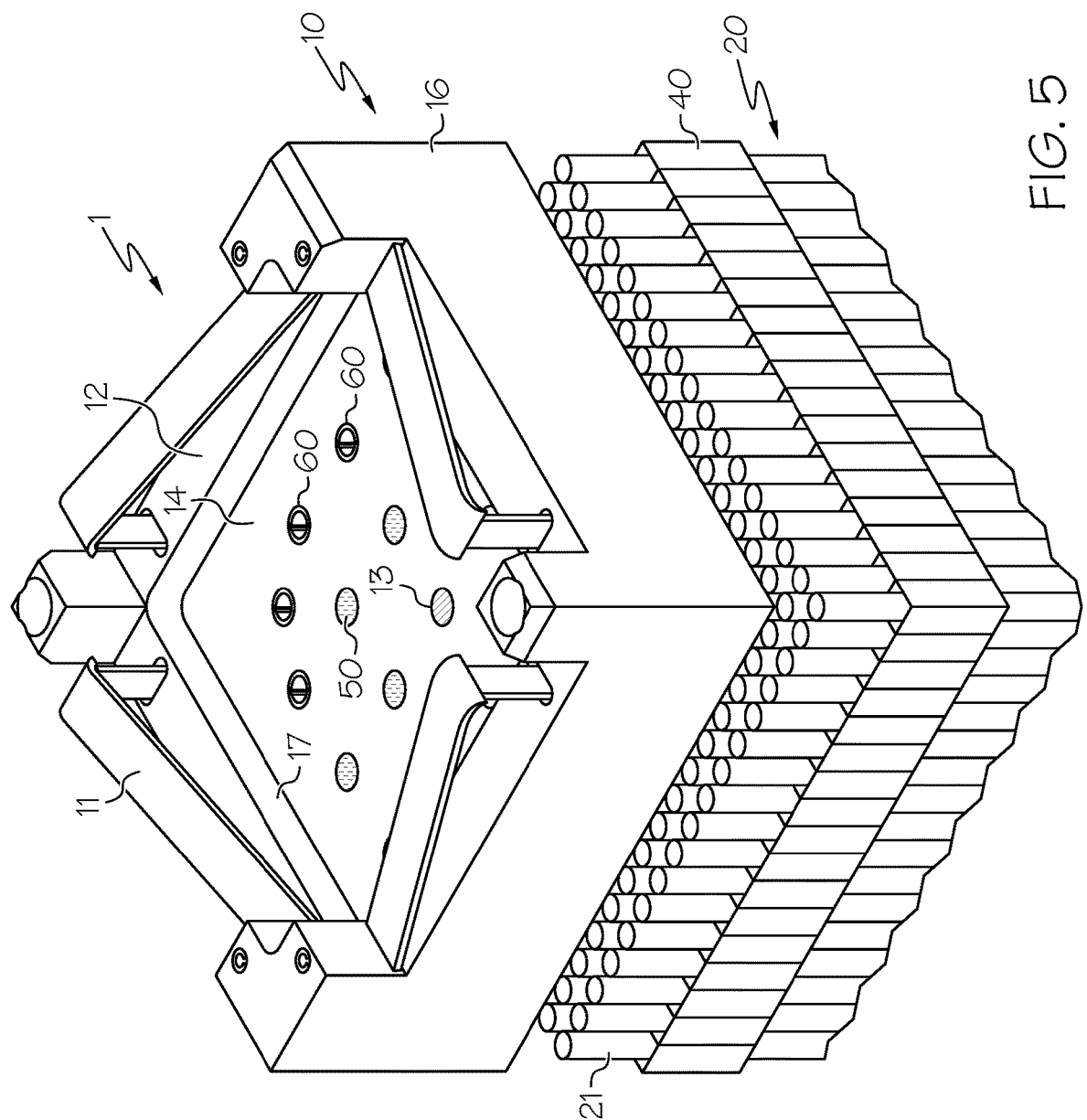
FIG. 5 is a perspective view illustrating an example of the fuel assembly taken in area 2 in FIG. 1 with neutron absorber members inserted into control rod guide tubes.
Figure 6:
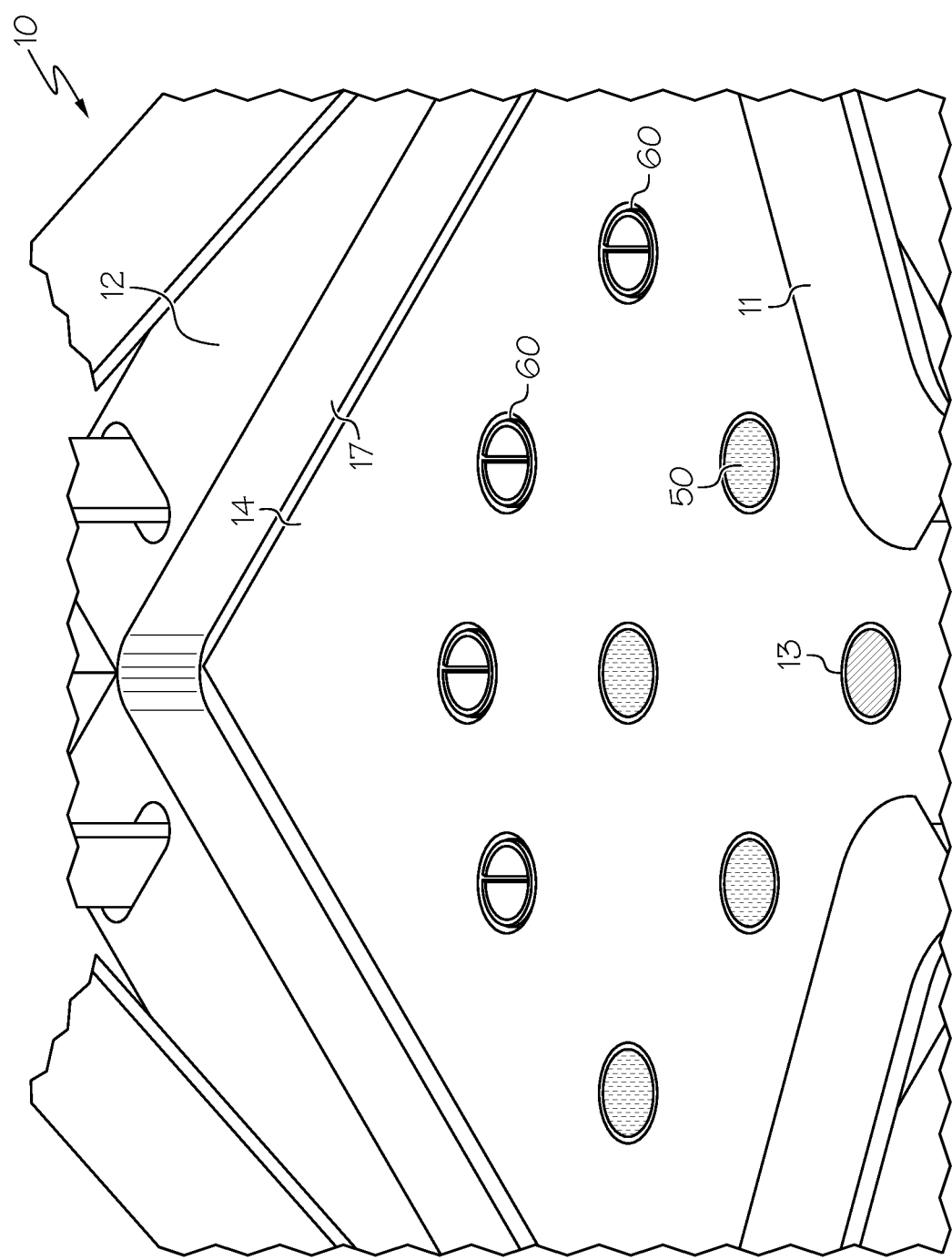
FIG. 6 is a close-up view illustrating an example of the fuel assembly of FIG. 5 with the neutron absorber members inserted into the control rod guide tubes.

Referring now to FIG. 3, a single example neutron absorber member 60 is shown which is designed to facilitate insertion of said neutron absorber member 60 into a deformed control rod guide tube 50. The neutron absorber member 60 may have a length that is less than a length of said control rod guide tube 50 that the neutron absorber member 60 is configured to be inserted into. For example, an axial length of the neutron absorber member 60 may be about 0.5% less than a length of an inner portion of a corresponding control rod guide tube 50. Further the neutron absorber member 60 may have a length that is substantially equivalent to a length of said control rod guide tube 50 that the absorber member is configured to be inserted into and have an effective length that continuously extends substantially throughout the length of the active fuel region of the fuel assembly 1. Generally, the neutron absorber member 60 may have an axial length greater than or equal to 3 feet (1 meters), and in many cases an axial length of 12 feet (3.6 meters) to 14 feet (4.2 meters), or greater.

For example, each of the neutron absorber members 60 may include multiple sections (not shown) having a combined length that is substantially equivalent to the length of the corresponding control rod guide tube 50. Each of the neutron absorber members 60 may additionally have an outer diameter that enables the neutron absorber member 60 to fit within an inner diameter of the inner portion of the control rode guide tube 50.

In the examples described and illustrated herein, each of the neutron absorber members 60 is a tube 61 having a split 62 throughout a length of the neutron absorber member 60. The split 62 extends radially completely through a sidewall of the tube 61. Further, the split 62 runs throughout the entire axial length of the tube 61.

Figure 7:
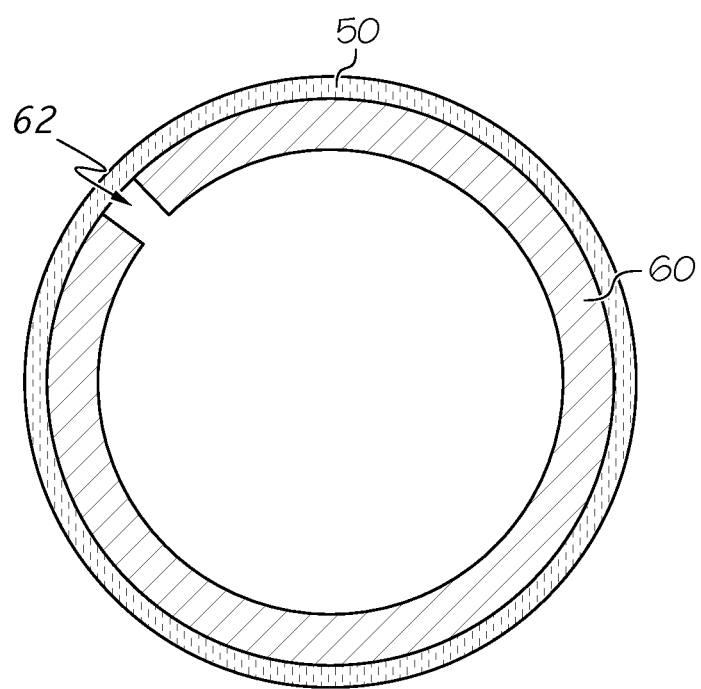
FIG. 7 is a top view illustrating an example of the neutron absorber member inserted into the control rod guide tube.
Figure 8:
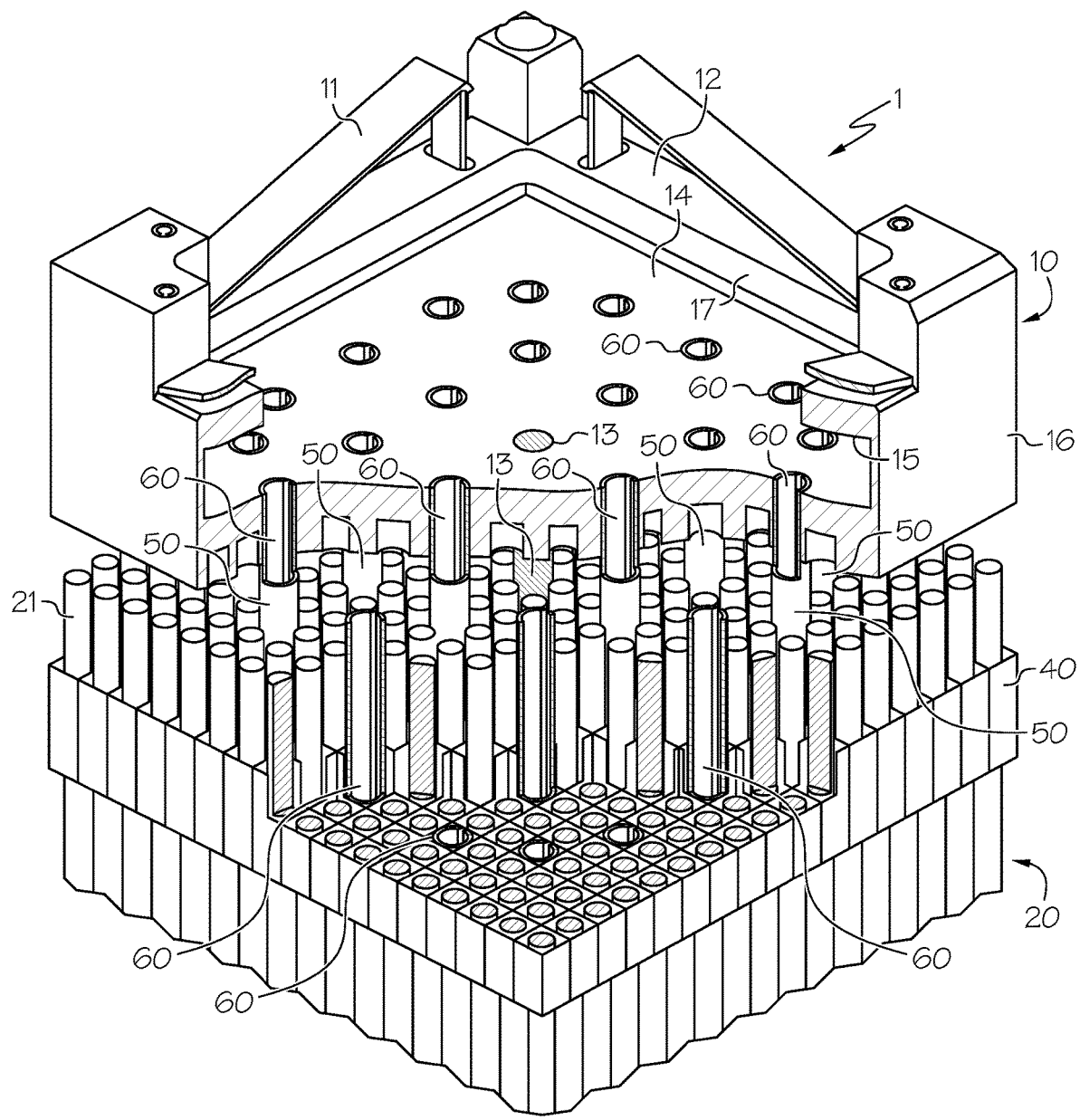
FIG. 8 is a cut-away perspective view illustrating an example of a structure of the fuel assembly of FIG. 5 with neutron absorber members inserted into control rod guide tubes.
Figure 9:
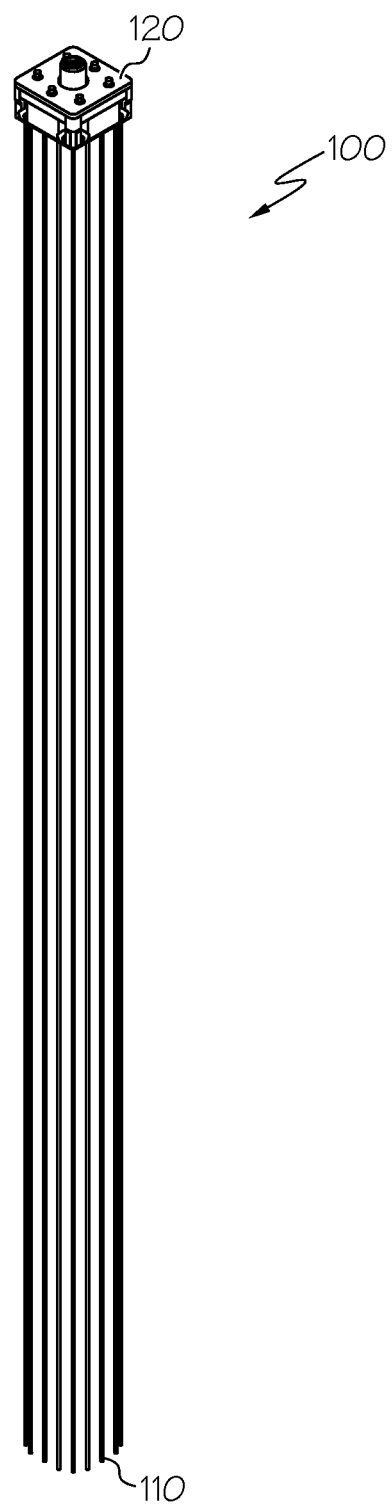
FIG. 9 is a perspective view illustrating an example of a neutron absorber member insertion apparatus.
Figure 13:
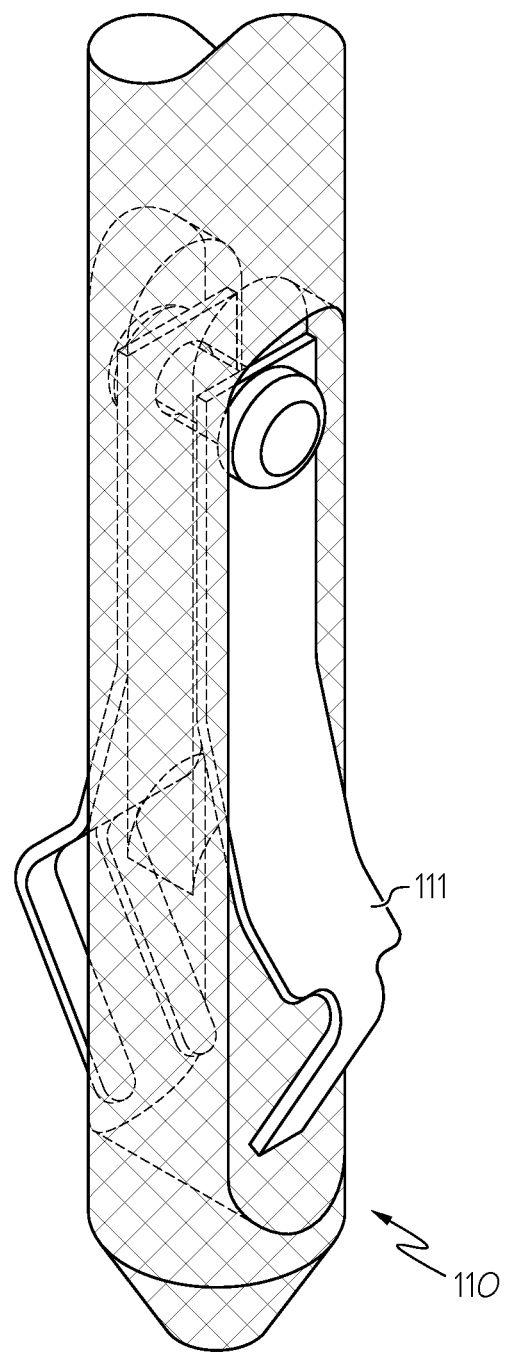
FIG. 13 is a perspective view illustrating an example of a bottom portion of the insertion tool rod of FIG. 10.
Figure 14:
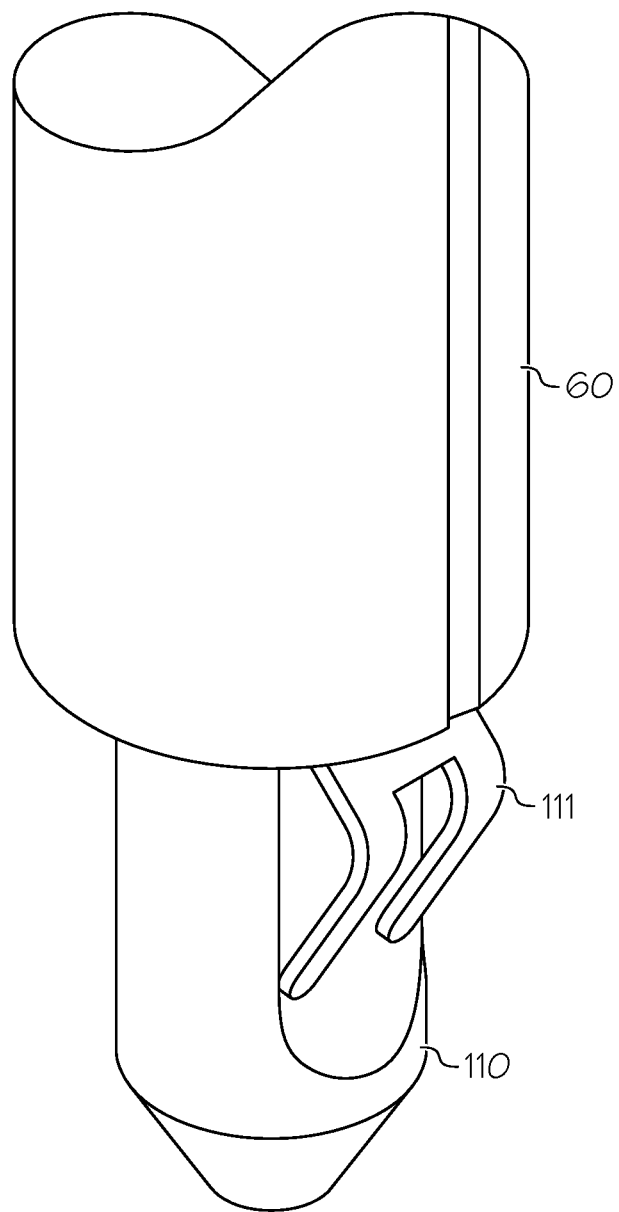
FIG. 14 is a perspective view illustrating an example of the bottom portion of the insertion tool rod of FIG. 13 having a neutron absorber member supported thereon.

The split 62 may cause the neutron absorber member 60 to substantially have a C-shape in the neutron absorber members 60 when viewing the neutron absorber members 60 from above, such as in the examples illustrated in FIGS. 4 and 7. As will be described, the C-shaped geometry formed by the split provides significant mechanical advantages and improvements to the design of the neutron absorber.

A width of a split 62 of an installed neutron absorber member 60 may vary throughout the length of the neutron absorber member 60 according to a shape of the respective control rod guide tube 50 (i.e., resulting from a shape and local deformities and/or curves of the control rod guide tube). As shown in FIG. 4, the split 62 in the sidewall of the tube 61 is defined by a gapped distance between a first end wall 63*a* and a second end wall 63*b*. Due to the C-shaped geometry of the neutron absorber member 60, the sidewall of the tube 61 is resiliently biased radially outwards. As such, the resilient outwards bias of the sidewall thereby biases the first end wall 63*a* away from the second end wall 63*b*.

In operation, when the neutron absorber member 60 is being inserted into the corresponding control rod guide tube 50, the resilient outwards bias of the sidewall allows various sections of the tube 61 to deform into abutment with the contours of an inner circumferential surface of the control rod guide tube 50. The absorber member with the C-shaped geometry formed by the split is much easier to insert completely into the control rod guide tubes, even with the deformities. This is a direct result of the C-shaped geometry that enables the diameter of the claimed absorber members to be dynamically adjustable when it encounters a deformity or curved portion of the control rod guide tubes. Specifically, when the C-shaped absorber member encounters a deformity or curved portion, it can naturally reduce its cross-sectional diameter (i.e., by closing the gap of the split in the tube), and then resiliently expands outwards upon passing by the deformity. For example, if the control rod guide tube 50 has a U-shaped bulge around its center section, then as the tube 61 is being inserted therein, the section of the tube 61 engaging with the U-shaped bulge will deform such that the gapped distance between the first and second end walls 63*a*, 63*b* changes. Thus, the outer circumference of the tube 61 is able to conform into abutment against an inner circumference that is variable along the length of the control rod guide tube 50 and can readily assume the same curved shape as the control rod guide tube.

When the neutron absorber member 60 is in a fully installed position within the corresponding control rod guide tube 50, the gapped distance between the first and second end walls 63*a*, 63*b* at different locations along the axial length of the tube 61 depends upon corresponding geometry of the control rod guide tube 50. For example, when the corresponding control rod guide tube 50 has a U-shaped bulge, the gapped distance at a center section 64*b* of the tube 61 will differ from a gapped distance at a top section 64*a* and/or bottom section 64*c* of the tube 61 (see FIG. 3). Specifically, in the example above, the gapped distance at the center section 64*b* of the tube 61 may be minimized or even eliminated, such that first end wall 63*a* physically contacts the second end wall 63*b*.

The split 62 extends completely through the sidewall and runs throughout the entire axial length of the tube 61 to thereby facilitate insertion of the neutron absorber member 60 into a corresponding control rod guide tube 50 such that an outer peripheral surface of the tube 61 exerts a force in a radially outward direction directly upon an inner peripheral surface of the corresponding control rod guide tube 50. Further, the split 62 provides additional advantages relating to manufacturing and cost efficiency.

As a result, the C-shape is compressed as it is inserted into the control rod guide tube, but expands when exposed to the heat of the fuel assembly. This compressible/conformable design provides several benefits that are not available with a complete cylindrical body. First, the compressible design naturally and resiliently expands outwards to frictionally engage the inner surfaces of the control rod guide tube to make the new neutron absorber difficult to remove from the control rod guide tube, which is preferred by the Nuclear Regulatory Commission. In this manner, the claimed absorber member with a split provides a substantial mechanical benefit that enables the absorber member to be easily inserted into the control rod guide tubes, and then remain in place due to expansion and friction. Indeed, the width of the split in the tube can even be specifically adjusted during manufacturing based upon the known deformity or curvature of the actual control rod guide tubes.

In this example, each of the neutron absorber members 60 is formed substantially of an aluminum-$B_4C$ metal matrix composite or composed of a metal matrix including boron carbide, in which the amount of boron carbide corresponds with a reactivity control provided to the spent fuel assembly 1 by the corresponding neutron absorber member 60.

Conventional neutron absorber members are manufactured from aluminum boron-carbide or any other materials or combination of materials known to one having ordinary skill in the art. Conventional methods of manufacturing said neutron absorber members include extruding processes. Such a process requires expensive machinery, intricate components (i.e., dies) and extensive change over operations for differently configured neutron absorber members.

Due to the split 62 in the sidewall of the tube 61, the aforementioned neutron absorber member 60 depicted in FIGS. 3-4 is able to be manufactured using a different process. For example, raw materials may be manufactured and supplied in sheet form and then subsequently rolled into a desired shape, such as the C-shaped geometry. Additionally, the use of a precision rolling process to form the C-shape can enable a precisely manufactured gap width of the split 62 and outer diameter of the neutron absorber member 60. The process of rolling the neutron absorber member 60 into its final shape eliminates many of the above-described disadvantages associated with extruding.

However, examples described herein are not limited thereto. For example, the neutron absorber member 60 may be formed substantially of solid rod of aluminum boron-carbide or any other materials or combination of materials known to one having ordinary skill in the art that are able to be extruded or formed to tolerances that are provided by aluminum-$B_4C$ metal matrix composite.

In examples illustrated in FIGS. 9-22, a neutron absorber member insertion apparatus 100 includes an insertion tool base 120 and insertion tool rods 110. The insertion tool base 120 includes a cap plate 122, a top plate 123, standoff sides 124, and standoff corners 125. The cap plate 122 is connected to the top plate 123 and contacts the top plate 123 and the standoff corners 125. The top plate 123 is connected to and contacts the cap plate 123, the standoff sides 124, and the standoff corners 125.

The insertion tool base 120 is configured to secure multiple insertion tool rods 110 therein to extend from the insertion tool base 120. The cap plate 122, the top plate 123, the standoff sides 124, and the standoff corners 125 include various bores and insets with which the insertion tool rods 110 are configured to interact such that the insertion tool rods 110 are secured by the insertion tool base 120 while extending from the insertion tool base 120. Examples of these bores and insets include rod clearance relief 152 inset in a bottom side 170 of the cap plate 122, top rod bores 150 positioned through the top plate 123, and standoff side rod bores 142 positioned through the standoff sides 124.

The insertion tool rods 110 are removably secured within and extending from the insertion tool base 120 according to a position of the control rod guide tubes 50 into which the corresponding neutron absorber members 60 are to be inserted. The insertion tool rods 110 are set by and extend through the various bores and insets of the insertion apparatus 100 mentioned above. The insertion tool rods 110 are placed strategically into the insertion apparatus 100 to correspond with the control rod guide tubes 50 in which the neutron absorber members 60 will be inserted. Each of the neutron absorber members 60 may be configured to at least partially surround an insertion tool rod 110. Each insertion tool rod 110 is configured to hold a neutron absorber member 60 partially surrounding the insertion tool rod 110 thereon until full insertion of the neutron absorber member 60 into a corresponding control rod guide tube 50 is achieved.

An example structure of an insertion tool rod 110 is illustrated in FIGS. 10-14. A dowel pin bore 154 is positioned through the insertion tool rod 110 at an upper portion thereof. The dowel pin bore 154 is configured to accommodate a dowel pin 149 extending therethrough. The dowel pin 149 is configured to interact with a dowel pin inset 144 positioned in a top surface 180 of the top plate 123 that extends from opposite sides of a top rod bore 150. The insertion tool rod 110 can be inserted through the top rod bore 150 of the top plate 123 at the top surface 180. Upon full insertion into the top rod bore 150, the dowel pin 149 is configured to rest within the dowel pin inset 144, thereby substantially inhibiting any likelihood of the insertion tool rod 110 slipping through the top rod bore 150 or being removed from the insertion apparatus 100 through down force. Further, the resting of the dowel pin 149 within the dowel pin inset 144 substantially inhibits an ability of the insertion tool rod 110 to axially rotate when the bottom side 170 of the cap plate 122 is place on the top surface 180 of the top plate 123, as the bottom side 170 of the cap plate 122 covers the dowel pin inset 144 and the dowel pin 149 positioned within the dowel pin insert 144.

Each of the insertion tool rods 110 additionally includes a spring 111 positioned at a lower portion thereof. The spring 111 is biased outward from a center of the insertion tool rod 110 and has a portion that protrudes outward from the insertion tool rod 110. The spring 111 is configured to inhibit removal of a neutron absorber member 60 placed there above and over, thereby serving to hold the neutron absorber member 60 on the insertion tool rod 110 until full insertion of the neutron absorber member 60 into the corresponding control rod guide tube 50 is achieved. In the examples illustrated in FIGS. 10 and 13, the insertion tool rod 110 includes two springs 111 on opposing sides of the insertion tool rod 110. However, the insertion tool rod 110 disclosed herein is not limited thereto. For example, an insertion tool rod 110 may include any number of springs 111 positioned at any particular orientation that would inhibit removal of items placed above the springs 111 or mechanically actuated mechanism for positive retention during the insertion process.

The neutron absorber member 60 can be inserted on the insertion tool rod 110 from the bottom of the insertion tool rod 110. In order for the neutron absorber member 60 to be inserted onto the insertion tool rod 110, the spring 111 is squeezed inwardly against its natural bias, thereby allowing the neutron absorber member 60 to be inserted over and above the spring 111 and onto the insertion tool rod 110. After a bottom end of the neutron absorber member 60 is positioned above the protruding portion of the spring 111, the spring 111 returns to its naturally biased state. As a result, the protruding portion of the spring 111 holds the neutron absorber member 60 there above at least partially surrounding the insertion tool rod 110 and inhibits the neutron absorber member 60 from being removed from at least partially surrounding the insertion tool rod 110 until the full insertion of the neutron absorber member 60 within the corresponding control rod guide tube 50 is achieved.

The cap plate 122 constitutes a top surface 160 of the insertion tool base 120. The top plate 123 is positioned underneath the cap plate 122 and has a top surface 180 configured to be in contact with a bottom surface 170 of the cap plate 122. The cap plate 122 includes cap plate bolt bores 155 through which cap bolts 126 are configured to extend into top plate bolt bores 146 of the top plate 123 and secure the top plate 123 to the cap plate 122. The cap plate 122 additionally includes a handling bore 153 through which a handling interface 121 positioned on the top surface 180 of the top plate 123 extends for mating with a handling tool (not shown). When mated to the handling interface 121, the handling tool can allow an operator to manipulate the insertion apparatus 100 in order to fully insert the neutron absorber members 60 into the control rod guide tubes 50. The cap plate 122 further includes rod clearance relief 152 that is inset into the bottom side 170 of the cap plate 122. The rod clearance relief 152 accommodates a top portion of the insertion tool rod 110 extending above the top plate 123 and an upper surface of the dowel pins 149.

When the cap plate 122 is fitted onto the top plate 123, the handling interface 121 of the top plate 123 extends through the handling bore 153 of the cap plate 122 Additionally, the insertion tool rods 110 are inserted through the top rod bores 150 of the top plate 123 such that the dowel pins 149 of the insertion tool rods 110 rest in the dowel pin insets 144 of the top plate 123. As a result of the dowel pins 149 being supported by the dowel pin insets 144 of the top plate 123, the top portions of the insertion tool rods 110 that are held above the top plate 123 fit inside the rod clearance relief 152 of the cap plate 122. The cap bolts 126 are secured within the cap plate bolt bores 155 and the top plate bolt bores 146, thereby securing the top plate 123 to the cap plate 122. The securing of the top plate 123 to the cap plate 122 subsequently secures the top portions of the insertion tool rods 110 extending above the top plate 123 within the rod clearance relief 152 of the cap plate 122. The cap plate 122 secures the dowel pin 149 that engages the insertion tool rods 110 inhibiting an impact of any upward forces placed on the insertion tool rods 110, thereby inhibiting an impact of any upward forces placed on the insertion tool rods 110. As a result, when the cap plate 122 and the top plate 123 are secured to each other, the insertion tool rods 110 are substantially inhibited from movement throughout a length thereof.

The top plate 123 additionally includes side bores 143 positioned on outer edges thereof. The side bores 143 are configured to accommodate side bolts 141 extending there through. The side bolts 141 extending through the side bores 143 positioned in the corners 185 of the top plate 123 extend through the side bores 143 and into standoff corners 125 respectively positioned underneath and outside of the corners 185 of the top plate 123. An outer surface of each of the corners 185 of the top plate 123 is slightly trimmed and contoured around the corner 185 in comparison with the outer surfaces of other areas of the top plate 123. This enables an upper portion 195 of each of the standoff corners 125 to substantially surround the outer surface of the corner 185 of the top plate 123. A lower portion 200 of each of the standoff corners 125 includes a standoff corner inset 190 through which a side bolt 141 is inserted after the side bolt 141 extends through the side bore 143 in the corner 185 of the top plate 123. The top plate 123 is connected to the standoff corners 125 by the side bolts 141 extending through the side bores 143 positioned in the corners 185 of the top plate 123 and the standoff corner insets 190 of the standoff corners 125 such that the standoff corners 125 are secured to and contacting the top plate 123.

The other side bores 143 are positioned on outer edges of the top plate 123 between the corners 185 of the top plate 123. The side bolts 141 extend through these side bores 143 and into standoff side insets 156 positioned within standoff sides 124. The top plate 123 is connected to the standoff sides 124 by the side bolts 141 extending through the side bores 143 positioned between the corners 185 of the top plate 123 and into the standoff side insets 156 such that the standoff sides 124 are secured to and contacting the top plate 123. The standoff sides 124 additionally include standoff side rod bores 142 positioned there through. The standoff side rod bores 142 accommodate insertion tool rods 110 positioned along the outer sides of the top plate 123 between the side bolts 141.

In examples illustrated in FIGS. 15 and 19-27, the insertion tool rods 110 extend through a neutron absorber member retainer 130. The retainer 130 includes retainer snaps 131 on outer edges thereof, which are configured to snap to the top nozzle 10 of the fuel assembly 1 above the control rod guide tubes 50. The retainer 130 is configured to retain neutron absorber members 60 in the corresponding control rod guide tubes 50 such that the insertion tool rods 110 are forced to release the neutron absorber members 60 when fully inserted in the control rod guides tubes 50 when the insertion tool rods 110 are being removed from the control rod guide tubes 50. The neutron absorber members 60 are secured between the springs 111 of the insertion tool rods 110 and the retainer 130 until the retainer 130 is snapped to the spent fuel assembly 1 and the insertion tool rods 110 are removed from the control rod guide tubes 50.

The retainer 130 is configured to retain the fully inserted neutron absorber members 60 within the control rod guide tubes 50. As a result, the neutron absorber members 60 are forced to squeeze the springs 111 inwardly when the insertion tool rods 110 are removed from the control rod guide tubes 50.

In an example, the retainer 130 includes retainer guides 132 at outer corners thereof. The retainer guides 132 are configured to engage inward side surfaces 17 of the ledges 12. The retainer 130 additionally includes a plate 133, which is configured to retain the neutron absorber members 60 inserted in the corresponding control rod guide tubes 50. Retainer bores 134 of the retainer 130 correspond with the control rod guide tubes 50 and are sized to retain the neutron absorber members 60 inserted in the corresponding control rod guide tubes 50. An instrumentation bore access port 135 of the retainer 130 is positioned through the plate 133.

The retainer snaps 131 illustrated herein are configured to engage bottom surfaces 15 of the ledges 12 and position the plate 133 adjacent to or contacting the surface 14 of the top nozzle 10. The retainer guides 132 of the retainer 130 extend upward from the plate 133. The retainer guides 132 and snaps 131 may be positioned adjacent to outer corners of the plate 133 and extending away from the control rod guide tubes 50 toward the ledges 12. In an example, the bottom surfaces 15 of the ledges 12 may be horizontal. In such an example, the snaps 131 may be curved from upwardly angled portions 137 of the snaps 131 to engage the bottom surfaces 15 of the ledges 12.

The curve separates the upwardly angled portions 137 of the snaps 131 from extending portions 139 and engaging portions 138 of the snaps 131. The engaging portions 138 illustrated herein are predominately horizontal and engage the bottom surfaces 15 of the ledges 12 when inserted under the ledges 12. The extending portions 139 illustrated herein extend from the engaging portions 138 of the snaps 131 over the portion of the surface 14 at which the control rod guide tubes 50 and the instrumentation tube 13 are accessible. Each of the extending portions 139 include a hole 136 configured to allow a tool (not shown) to disengage the engaging portion 138 of the snaps 131 from the bottom surfaces 15 of the ledges 12. Once the retainer snaps 131 illustrated herein engage the bottom surfaces 15 of the ledges 12, the retainer 130 is locked into place. The retainer bores 134 include a diameter that is less than a diameter of the neutron absorber members 60 to inhibit the neutron absorber members 60 from leaving or being removed from the control rod guide tubes 50.

Figure 15:
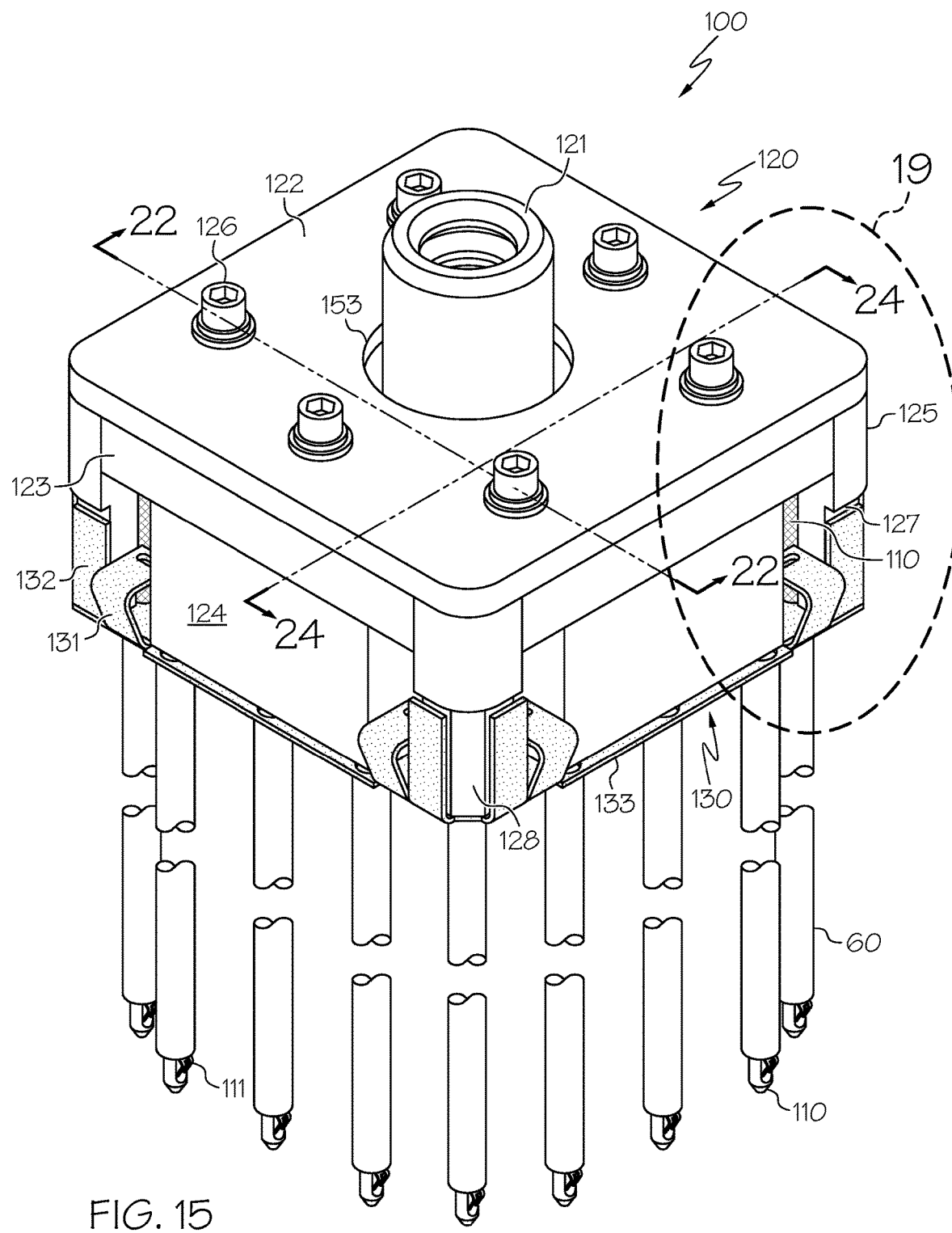
FIG. 15 is a condensed, close-up perspective view illustrating an example of the neutron absorber member insertion apparatus of FIG. 9.
Figure 16:
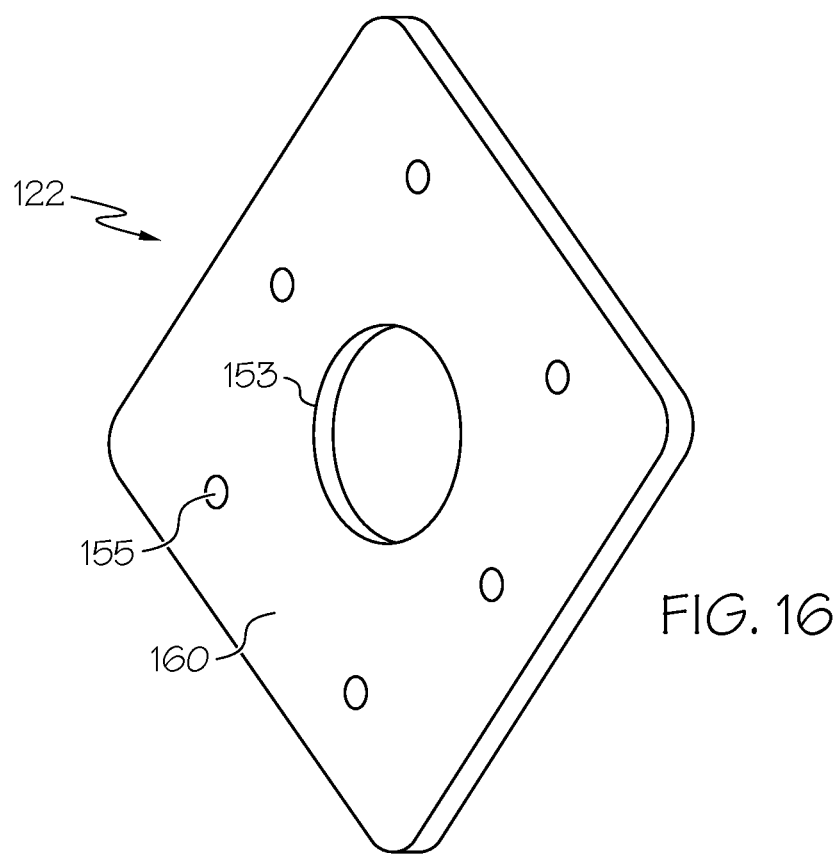
FIG. 16 is a perspective view illustrating an example of a top side of a cap plate of the neutron absorber member insertion apparatus of FIG. 15.
Figure 17:
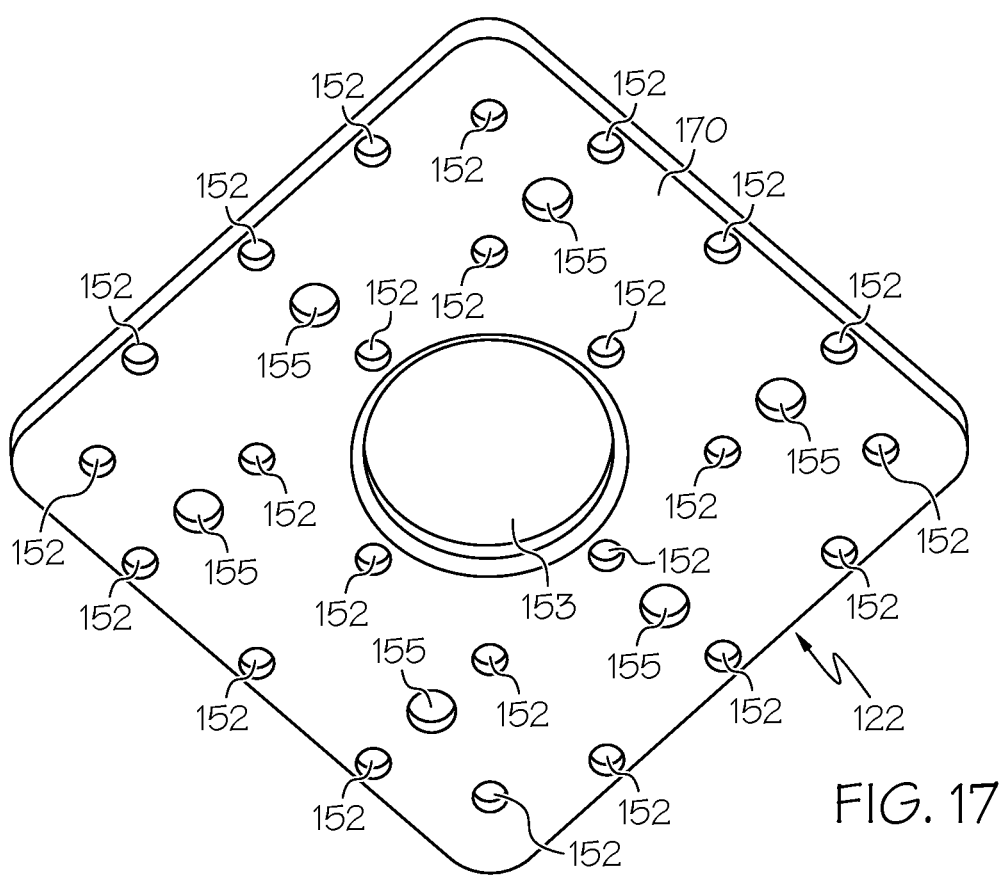
FIG. 17 is a perspective view illustrating an example of a bottom side of the cap plate of FIG. 16.
Figure 18:
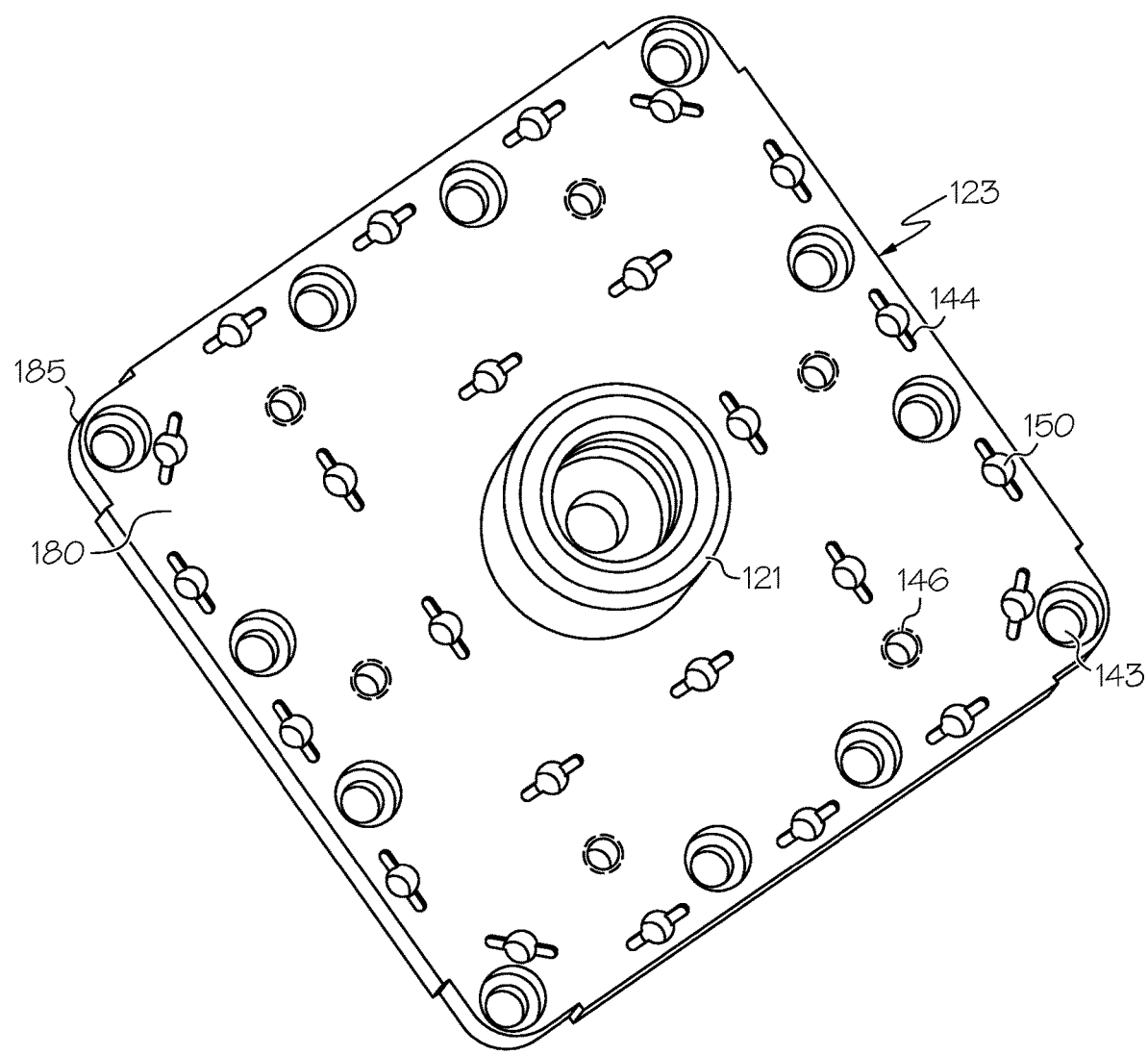
FIG. 18 is a perspective view illustrating an example of a top side of top plate of the neutron absorber member insertion apparatus of FIG. 15.
Figure 19:
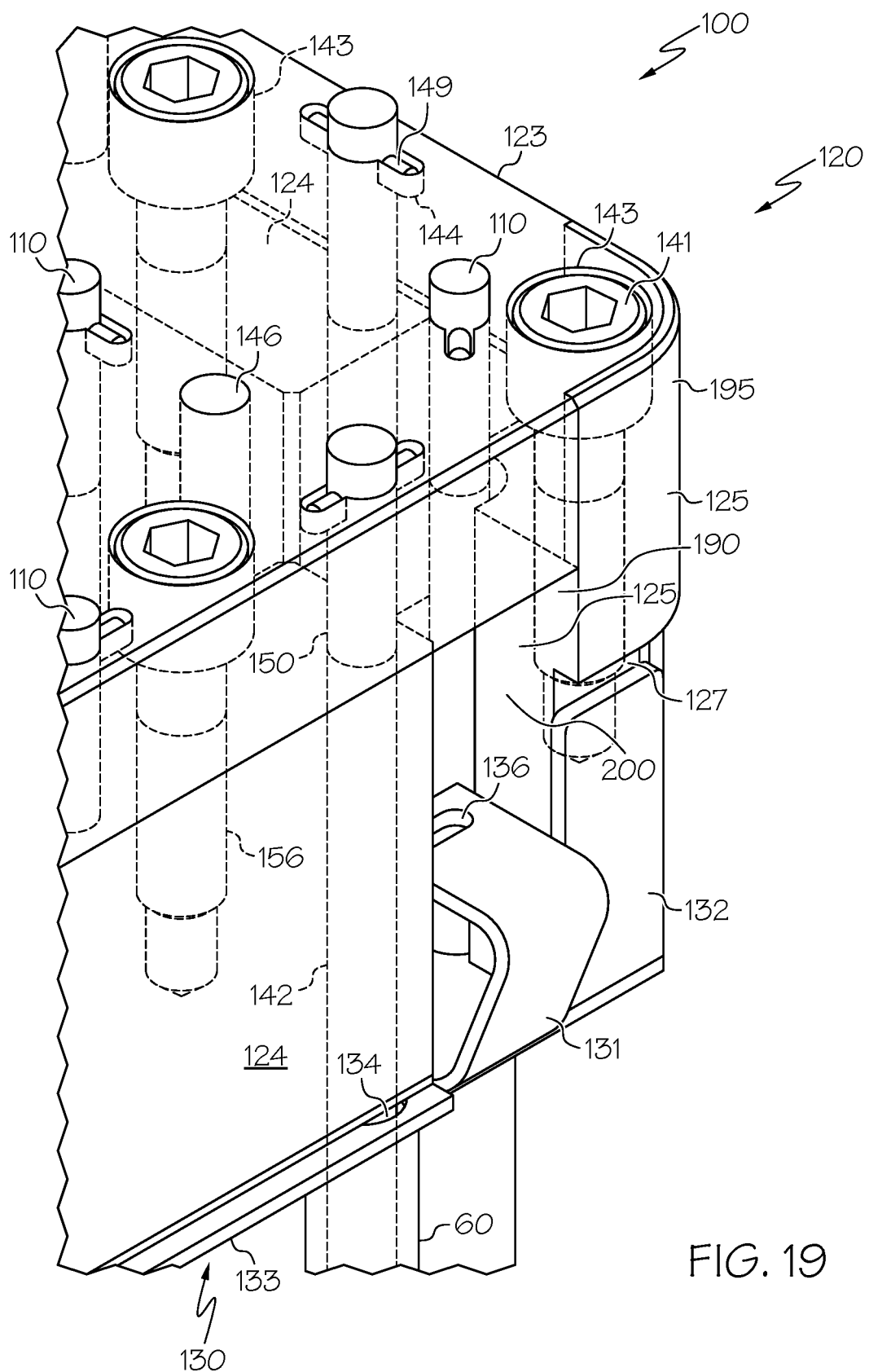
FIG. 19 is a sectional, see-through, perspective view illustrating an example of the top plate positioned on the standoff corners and standoff sides taken in area 15 of the neutron absorber member insertion apparatus of FIG. 15.
Figure 20:
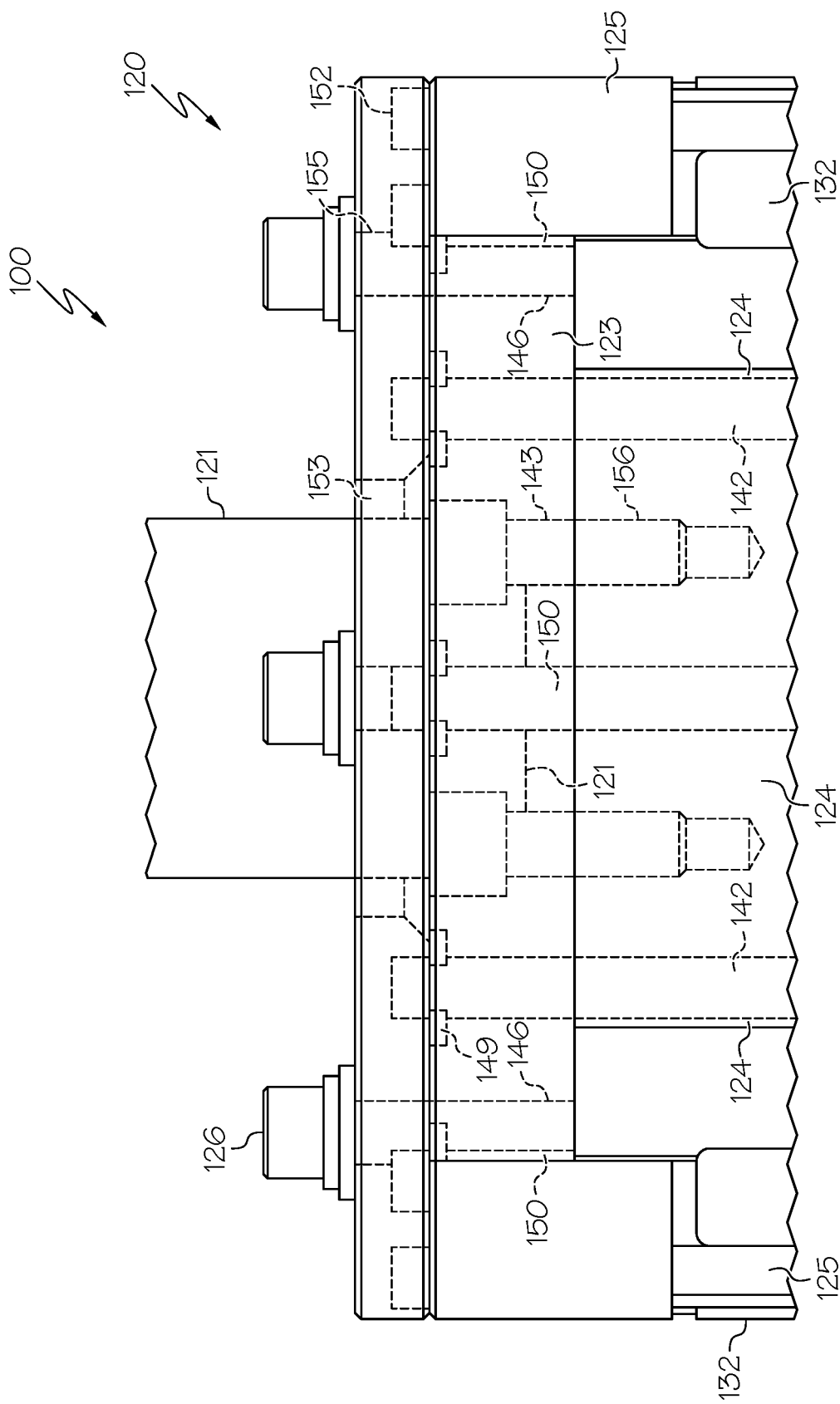
FIG. 20 is a side, see-through view illustrating and example of an upper portion of the neutron absorber member insertion apparatus of FIG. 15.
Figure 21:
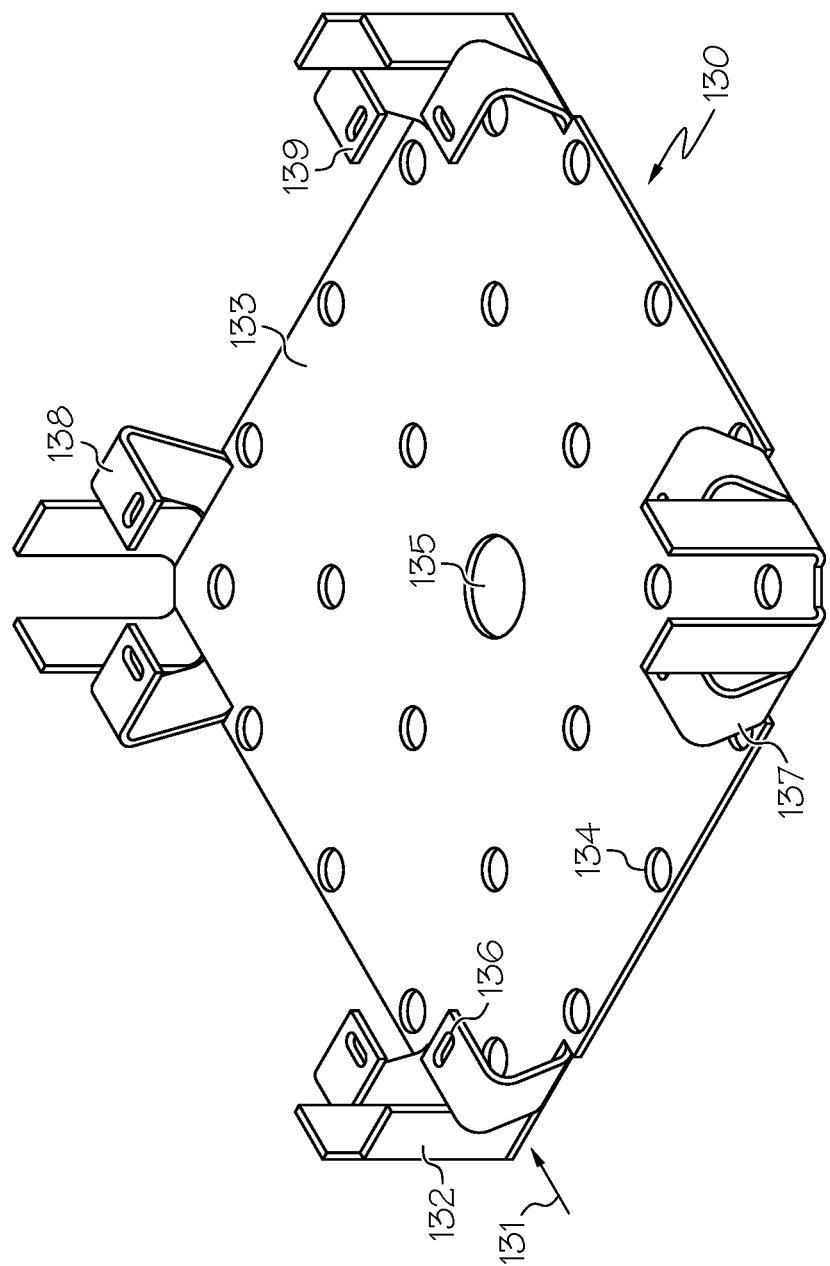
FIG. 21 is a perspective view illustrating an example of a neutron absorber member retainer.
Figure 22:
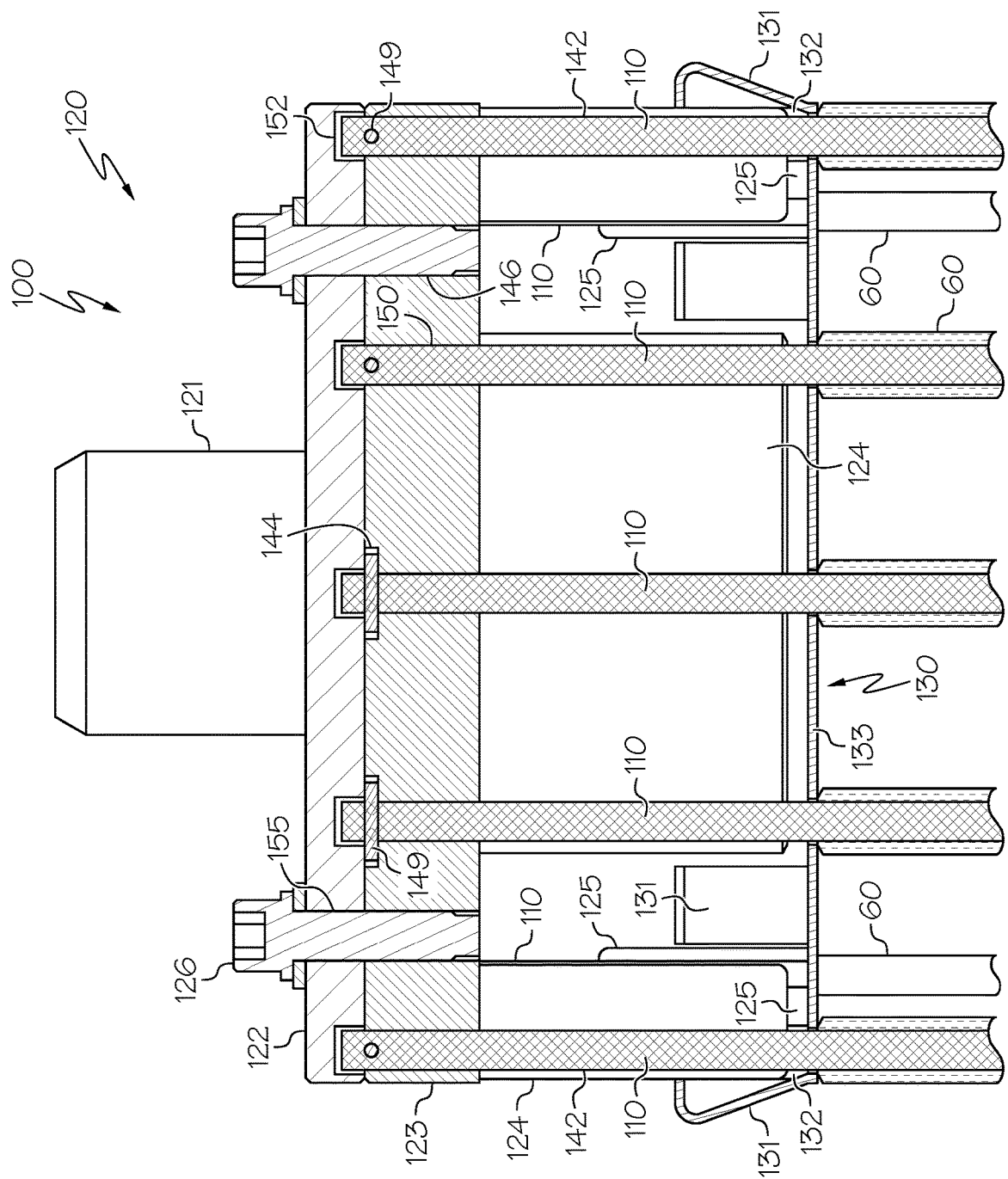
FIG. 22 is a sectional view illustrating an example of the neutron absorber member insertion apparatus and the neutron absorber member retainer taken across 22-22 of FIG. 15.

FIG. 15 illustrates an example of the retainer 130 interacting with the insertion tool base 120 before insertion of the neutron absorber members 60 into the control rod guide tubes 50. In this example, loads of the neutron absorber members 60 are placed upon the springs 111 of the insertion tool rods 110. The springs 111 inhibit the neutron absorber members 60 from falling from around the portions of the insertion tool rods 110 positioned above the springs 111. The insertion tool rods 110 extend through the retainer bores 134 from a point emanating from the cap plate 122.

As is additionally illustrated in FIGS. 24-27, prior to full insertion of the neutron absorber members 60 into the control rod guide tubes 50, the insertion tool rods 110 are sized such that the neutron absorber members 60 extend around the insertion tool rods 110 substantially from the springs 111 to the plate 133. As such, the neutron absorber members 60 are supported by the springs 111 of the insertion tool rods 110. Furthermore, the supported neutron absorber members 60 subsequently support the retainer 130.

The retainer 130 is supported by the neutron absorber members 60 such that the guides 132 are positioned adjacent to or contacting outer inset surfaces 127 of the standoff corners 125, which are positioned adjacent a rounded corner 128 of the standoff corners 125. Further, the snaps 131 are positioned between the standoff corners 125 and the standoff sides 124 and underneath the top plate 123. The upwardly angled portions 137 of the snaps 131 extend outward from the outer edges of the plate 133 of the retainer 130 until the snaps 131 curve into the engaging portions 138 of the snaps 131. The engaging portions 138, as well as the extending portions 139, are substantially horizontal and substantially parallel with the top plate 123 and the plate 133 of the retainer 130. The engaging portions 138 extend from a point outside peripheries of the insertion tool 120 and the retainer 130 to a point surrounded by the plate 133, a standoff side 124, a standoff corner 125, and the top plate 123.

Figure 23:
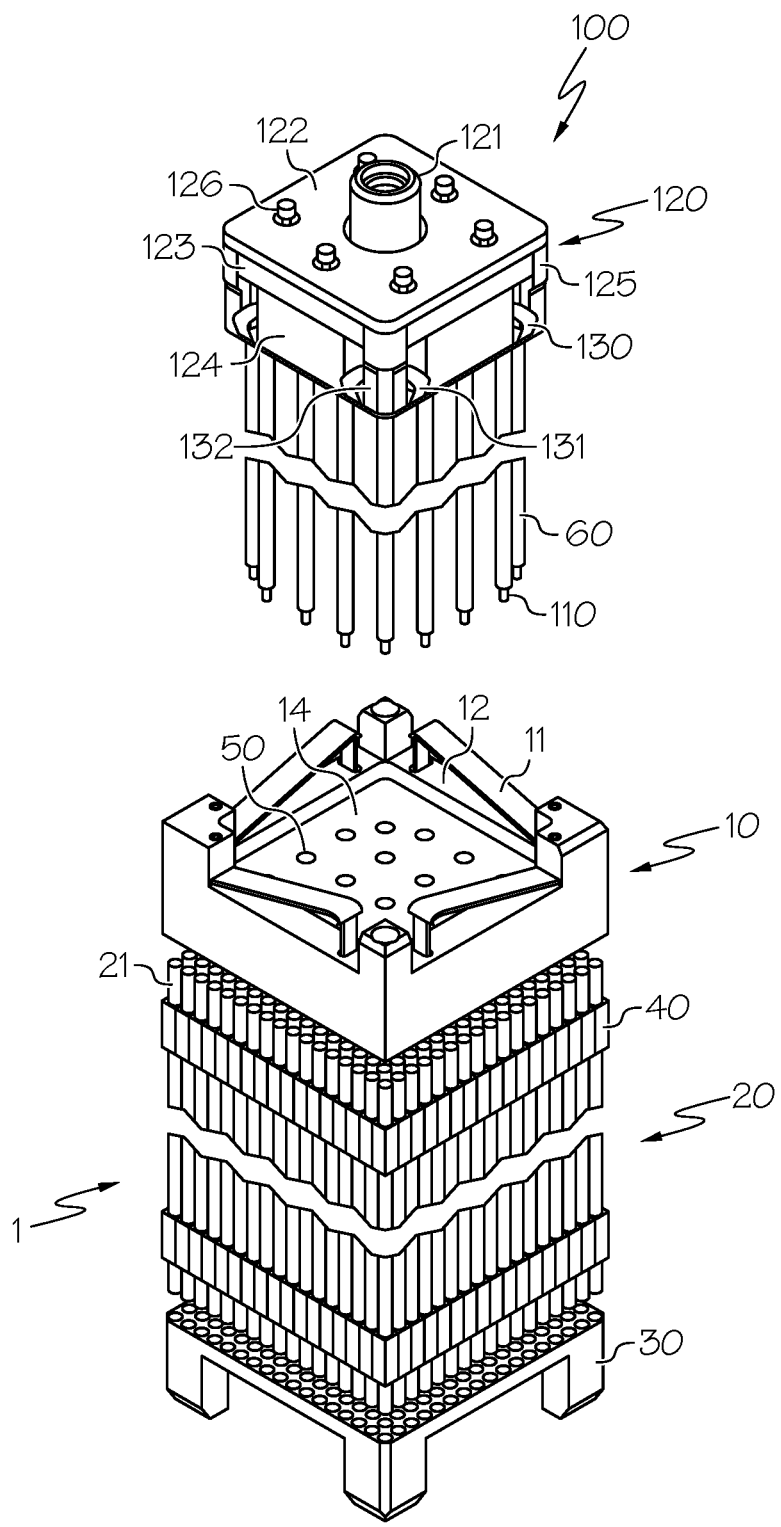
FIG. 23 is a perspective view illustrating an example of the neutron absorber member insertion apparatus of FIG. 15 in alignment with a condensed illustration of the fuel assembly of FIG. 1.

FIG. 23 illustrates the insertion apparatus 100 aligned for insertion of the neutron absorber members 60 into corresponding control rod guide tubes 50 of the fuel assembly 1. While the fuel assembly 1 has a certain example arrangement of the control rod guide tubes 50 and the insertion apparatus 100 illustrated herein is configured to provide insertion tool rods 110 in such an arrangement as to correspond to the arrangement of the control rod guide tubes 50, embodiments herein are not limited thereto. For example, the control rod guide tubes 50 can be arranged in any way necessary as recognized by one having ordinary skill in the art to provide control during operation of the fuel assembly 1. Similarly, the insertion tool 120 can be configured in such a way as to accommodate an arrangement of the control rod guide tubes 50.

Figure 24:
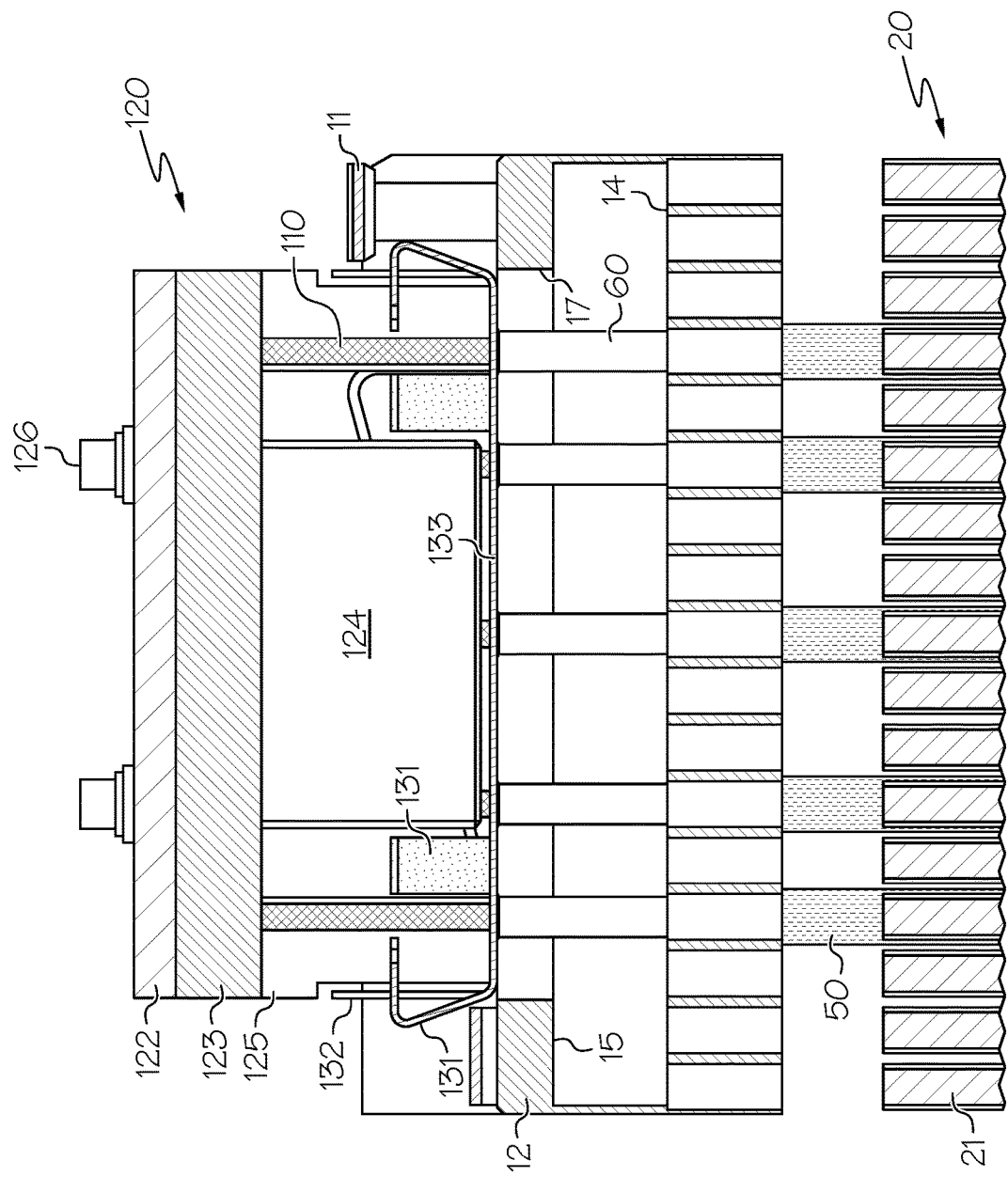
FIG. 24 is a sectional view taken across 24-24 of FIG. 15 illustrating an example of neutron absorber members being inserted into control rod guide tubes of the fuel assembly of FIG. 23 using the neutron absorber member insertion apparatus of FIG. 15.

FIGS. 24-27 illustrate an example process by which the neutron absorber members 60 may be inserted into the control rod guide tubes 50 using the insertion apparatus 100. In FIG. 24, the neutron absorber members 60 are in the process of being inserted into the control rod guide tubes 50. The retainer 130 is being supported by the neutron absorber members 60 and is positioned just above the inward side surfaces 17 of the ledges 12.

Figure 25:
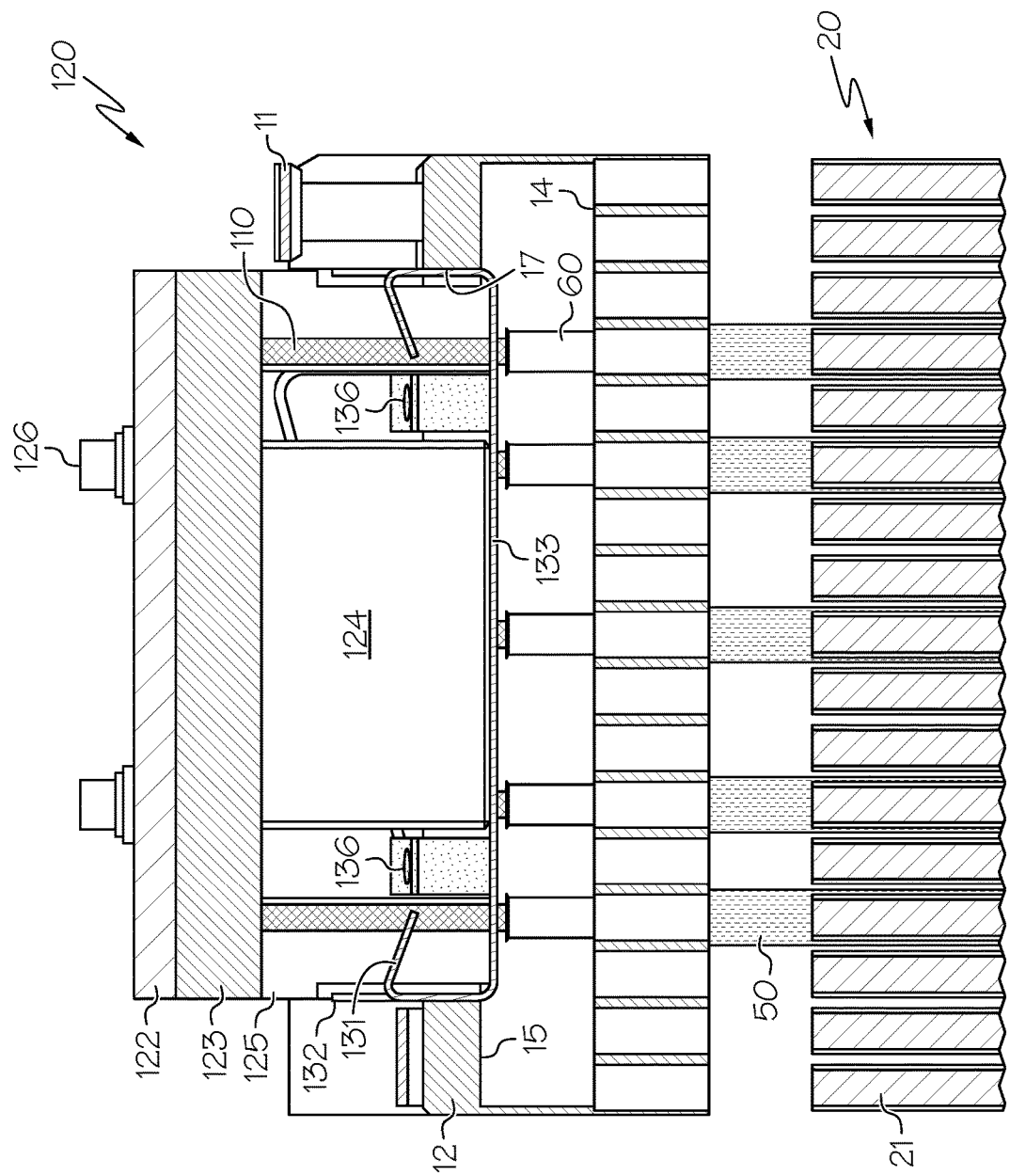
FIG. 25 is a sectional view taken across 24-24 of FIG. 15 illustrating an example of the neutron absorber members being further inserted into the control rod guide tubes of the fuel assembly of FIG. 24 using the neutron absorber member insertion apparatus of FIG. 24.

In FIG. 25, the insertion tool 120 has been pushed further toward the surface 14 of the top nozzle 10. The retainer 130 has been pushed between the inward side surfaces 17 of the ledges 12. The snaps 131, which are biased outwardly from the plate 133 area of the retainer 130, are pinched inward by the inward side surfaces 17 of the ledges 12. The guides 132 of the retainer 130 promote proper alignment of the insertion tool 120 with the top nozzle 10.

Figure 26:
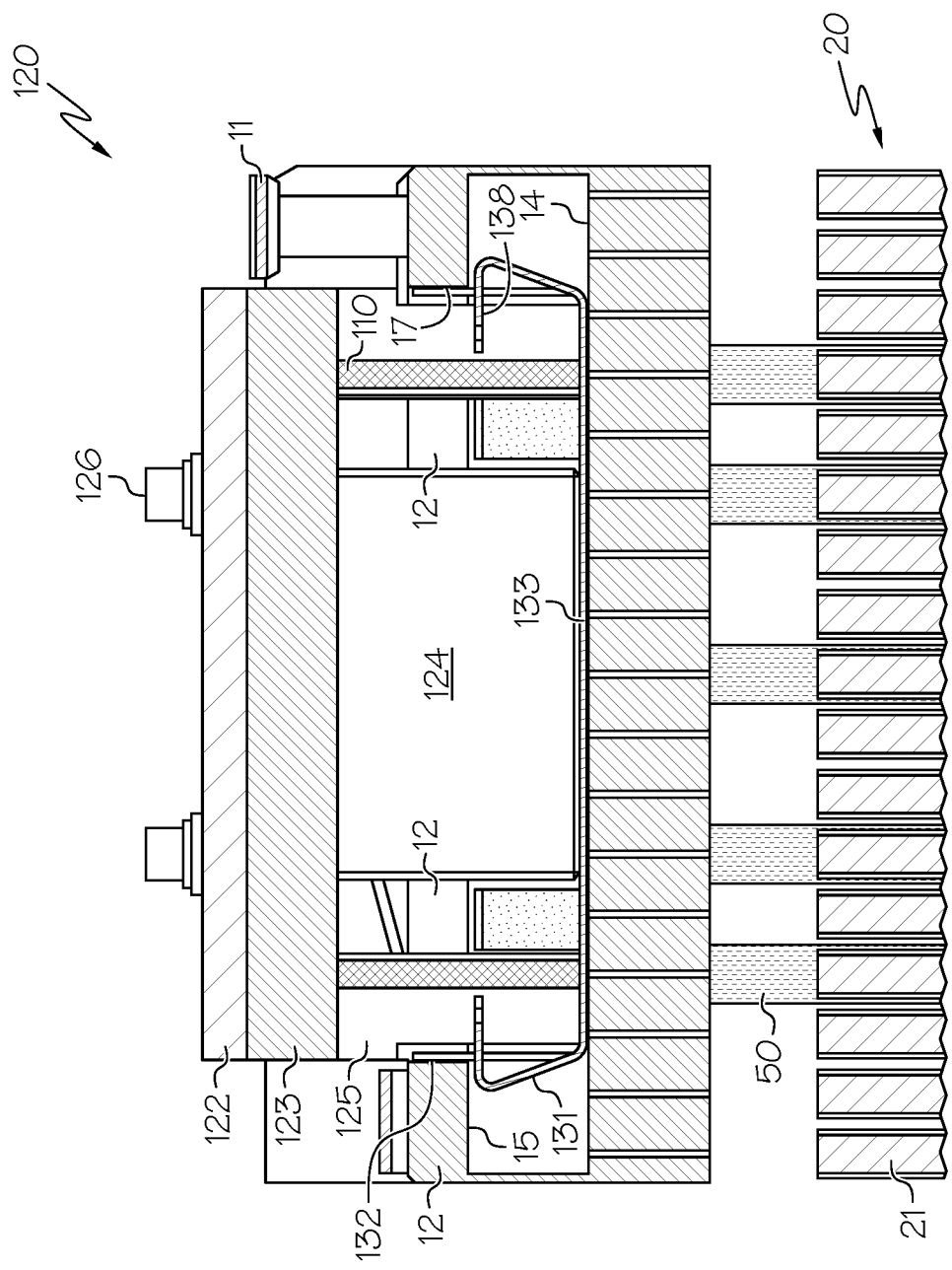
FIG. 26 is a sectional view taken across 24-24 of FIG. 15 illustrating an example of the neutron absorber members being fully inserted into the control rod guide tubes of the fuel assembly of FIG. 25 by the neutron absorber member insertion apparatus of FIG. 25.

In FIG. 26, the insertion tool 120 has been pushed to a point at which the neutron absorber members 60 are fully inserted into the control rod guide tubes 50. In this position, the snaps 131 of the retainer 130 have passed through the inward side surfaces 17 of the ledges 12 and extended outwardly according to their bias. As a result, engaging portions 138 of the snaps 131 are now underneath and engaged with the bottom surfaces 15 of the ledges 12, thereby inhibiting removal of the retainer 130 from the top nozzle 10 of the fuel assembly 1.

Figure 27:
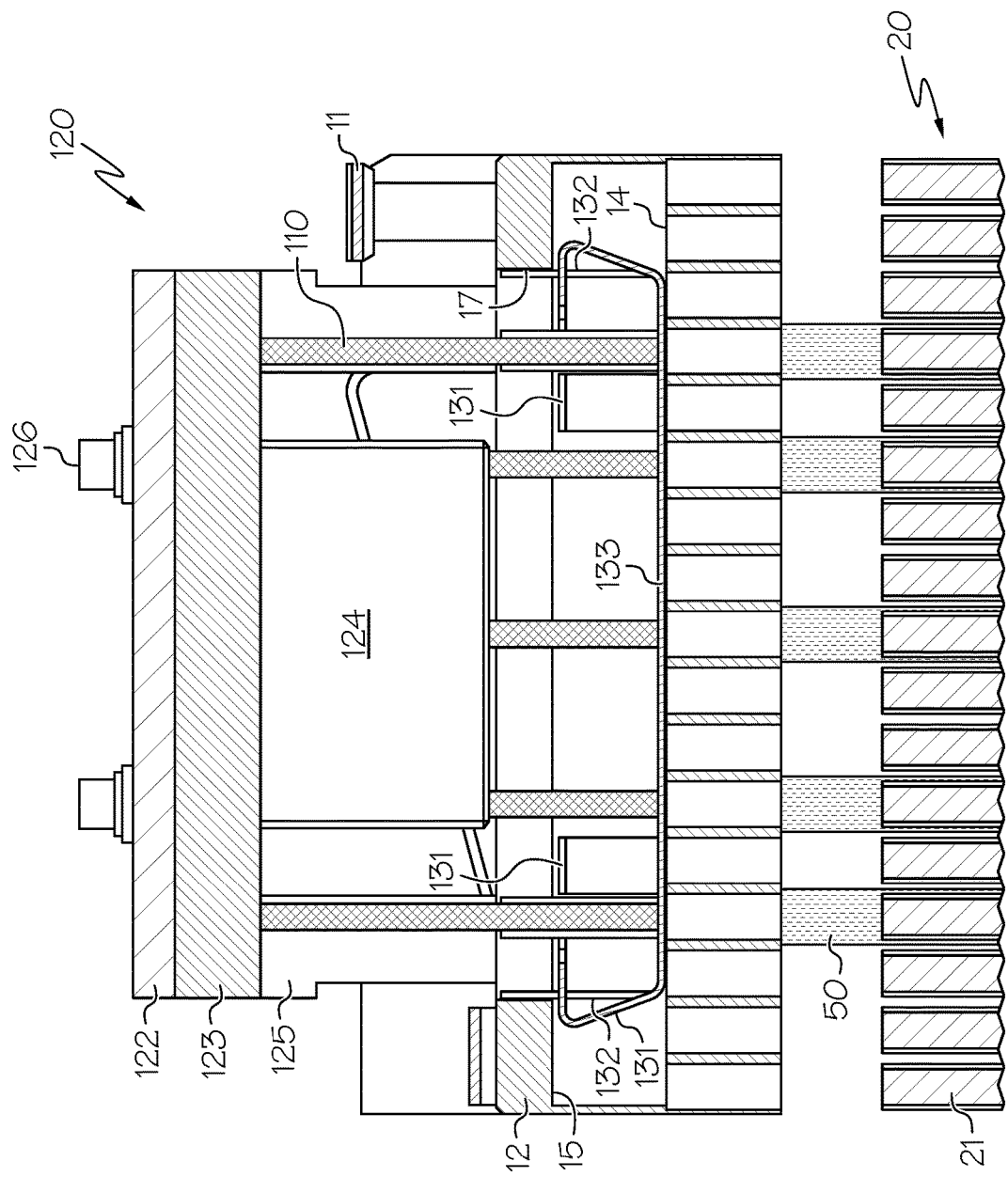
FIG. 27 is a sectional view taken across 24-24 of FIG. 15 illustrating an example of insertion tool rods of the neutron absorber member insertion apparatus of FIG. 26 being removed from the neutron absorber member tubes that are fully inserted into the control rod guide tubes of the fuel assembly of FIG. 25.

In FIG. 27, the insertion tool 120 is in the process of being pulled away from the fuel assembly 1. The retainer 130 is in place within the top nozzle 10 of the fuel assembly 1, thereby inhibiting the neutron absorber members 60 from being removed from the control rod guide tubes 50. Because the neutron absorber members 60 are inhibited from removal from the control rod guide tubes 50, the downward force being placed on the springs (not shown) at the lower portions of the insertion tool rods 110 by the neutron absorber members 60 serves to push the springs inward, thereby allowing the insertion tool rods 110 to be removed from within the neutron absorber members 60. When the insertion tool rods 110 are fully removed from the neutron absorber members 60, the springs will be free to expand toward their outward bias.

While the neutron absorber member retainer 130 is illustrated herein as inhibiting tubular neutron absorber members 60 comprising a tube split throughout a length of the tube from being removed from the control rod guide tubes 50, embodiments described herein are not limited thereto. For example, the neutron absorber member retainer 130 may inhibit the removal of neutron absorber members having various alternative shapes and constitutions.

A number of examples have been described above. Nevertheless, it will be understood that various modifications may be made. For example, suitable results may be achieved if the described elements are combined in a different manner and/or replaced or supplemented by other elements or their equivalents. Accordingly, other implementations are within the scope of the following claims.

What is claimed is:

1. A neutron absorber member that is configured to be inserted and installed into a control rod guide tube of a spent fuel assembly, the absorber member comprising:
a tube comprising a split extending radially completely through a sidewall of said tube throughout the entire axial length thereof, wherein the absorber member comprises a C-shaped geometry formed by the split,
wherein the sidewall of the tube is resiliently biased radially outwards, wherein during tube insertion into the control rod guide tube, the C-shaped geometry allows for the resiliently outwards bias to be overcome and a diameter of the tube to be reduced;
wherein the tube is comprised of a metal matrix composite that is configured to absorb neutrons emanating from said spent fuel assembly to maintain subcriticality of said spent fuel assembly; and
wherein the axial length of the tube is greater than or equal to 3 feet.

2. The absorber member of claim 1,
wherein the split in the sidewall is defined between a first end wall and a second end wall spaced a gap distance apart from the first end wall, and
wherein the resilient outwards bias of the sidewall thereby biases the first end wall away from the second end wall.

3. The absorber member of claim 2, wherein when the tube is being inserted within the control rod guide tube, the gap distance between the first and second end walls is variable so that an outer circumference of the tube is deformable and able to conform into abutment against an inner circumference of said control rod guide tube that the absorber member is configured to be inserted into.

4. The absorber member of claim 2, wherein when the tube is in a fully installed position, an outer peripheral surface of the tube exerts a force in a radially outward direction directly upon an inner peripheral surface of the control rod guide tube.

5. The absorber member of claim 2, wherein when the tube is in a fully installed position, the gap distance between the first and second end walls at different locations along the axial length of the tube can be dependent upon corresponding geometry of the control rod guide tube at said different locations so that the gap distance at one portion of the tube is different than at a second portion of the tube.

6. The absorber member of claim 1, wherein the axial length of the tube is at least 12 feet.

7. The absorber member of claim 1, wherein the absorber member is composed of the metal matrix composite that comprises boron carbide.

8. A spent fuel assembly comprising:
a control rod guide tube; and
a neutron absorber member configured to be inserted and installed into the control rod guide tube, the absorber member comprising:
a tube comprising a split extending radially completely through a sidewall of said tube throughout the entire axial length thereof, wherein the absorber member comprises a C-shaped geometry formed by the split,
   wherein the sidewall of the tube is resiliently biased radially outwards, wherein during tube insertion into the control rod guide tube, the C-shaped geometry allows for the resiliently outwards bias to be overcome and a diameter of the tube to be reduced;
   wherein the tube is comprised of a metal matrix composite that is configured to absorb neutrons emanating from said spent fuel assembly to maintain subcriticality of said spent fuel assembly; and
   wherein the axial length of the tube is greater than or equal to 3 feet.

9. The spent fuel assembly of claim 8, wherein the absorber member has a length that is less than a length of said control rod guide tube that the absorber member is configured to be inserted into.

10. The spent fuel assembly of claim 8, wherein the absorber member has a length that is substantially equivalent to a length of said control rod guide tube that the absorber member is configured to be inserted into.

\* \* \* \* \*